(12) United States Patent
Jiang et al.

(10) Patent No.: US 12,356,326 B2
(45) Date of Patent: *Jul. 8, 2025

(54) CONFIGURATION METHOD AND DEVICE

(71) Applicant: VIVO MOBILE COMMUNICATION CO., LTD., Guangdong (CN)

(72) Inventors: Dajie Jiang, Chang'an Dongguan (CN); Peng Sun, Chang'an Dongguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,956

(22) Filed: May 19, 2023

(65) Prior Publication Data

US 2023/0292236 A1 Sep. 14, 2023

Related U.S. Application Data

(63) Continuation of application No. 17/136,574, filed on Dec. 29, 2020, now Pat. No. 11,716,684, which is a (Continued)

(30) Foreign Application Priority Data

Jul. 11, 2018 (CN) .......................... 201810757947.5

(51) Int. Cl.
*H04W 52/02* (2009.01)
*H04B 7/06* (2006.01)
(Continued)

(52) U.S. Cl.
CPC ...... *H04W 52/0212* (2013.01); *H04B 7/0626* (2013.01); *H04W 24/02* (2013.01); *H04W 52/0229* (2013.01); *H04W 76/27* (2018.02)

(58) Field of Classification Search
CPC ......... H04W 52/0212; H04W 52/0229; H04W 76/27; H04W 24/02; H04B 7/0626
(Continued)

(56) References Cited

U.S. PATENT DOCUMENTS 10,856,265 B2 12/2020 Ryu
12,069,005 B2 * 8/2024 Loehr .................. H04L 5/0053
(Continued)

FOREIGN PATENT DOCUMENTS

CN 101729325 A 6/2010
CN 102143562 A 8/2011
(Continued)

OTHER PUBLICATIONS

EESR in EP application No. 19833042.5 dated Aug. 30, 2021.
(Continued)

*Primary Examiner* — Intekhaab A Siddiquee
(74) *Attorney, Agent, or Firm* — Price Heneveld LLP

(57) ABSTRACT

A configuration method and a device are provided. The method includes: sending a first message to a network-side device, where the first message explicitly or implicitly indicates a power saving mode or a power saving class of a terminal device; receiving, from the network-side device, first feedback information about the first message; and determining, based on the first feedback information, value(s) of one or more first parameters related to power consumption of the terminal device.

12 Claims, 12 Drawing Sheets

Related U.S. Application Data continuation of application No. PCT/CN2019/094521, filed on Jul. 3, 2019.

(51) Int. Cl.
  *H04W 24/02* (2009.01)
  *H04W 76/27* (2018.01)

(58) Field of Classification Search
  USPC .......................................................... 370/311
  See application file for complete search history.

(56) References Cited

U.S. PATENT DOCUMENTS

| | | | |
|---|---|---|---|
| 2008/0268917 A1 | 10/2008 | Chang et al. | |
| 2009/0197528 A1 | 8/2009 | Chin et al. | |
| 2010/0008278 A1* | 1/2010 | Kone | H04L 1/188 370/311 |
| 2013/0301499 A1* | 11/2013 | Jain | H04W 36/0055 370/311 |
| 2013/0301500 A1 | 11/2013 | Koc et al. | |
| 2014/0219151 A1 | 8/2014 | Damji et al. | |
| 2015/0223285 A1 | 8/2015 | Ljung et al. | |
| 2017/0013561 A1 | 1/2017 | Soldati | |
| 2018/0302128 A1 | 10/2018 | Akkarakaran et al. | |
| 2018/0367289 A1* | 12/2018 | Kim | H04L 5/0092 |
| 2019/0215897 A1 | 7/2019 | Babaei et al. | |
| 2019/0229874 A1 | 7/2019 | Lee et al. | |
| 2019/0364541 A1* | 11/2019 | Ryu | H04W 80/10 |
| 2020/0305094 A1 | 9/2020 | Ouchi et al. | |

FOREIGN PATENT DOCUMENTS

| | | |
|---|---|---|
| CN | 103581884 A | 2/2014 |
| CN | 104066076 A | 9/2014 |
| JP | 2010525756 A | 7/2010 |
| JP | 2016524364 A | 8/2016 |
| WO | 2014177184 A1 | 11/2014 |
| WO | 2015171984 A1 | 11/2015 |
| WO | 2017169301 A1 | 10/2017 |
| WO | 2018008980 A1 | 1/2018 |
| WO | 2018030714 A1 | 2/2018 |
| WO | 2018031623 A1 | 2/2018 |

OTHER PUBLICATIONS

Final office action in U.S. Appl. No. 17/136,574 dated Oct. 14, 2022.
JP office action in application No. 2021-500933 dated Sep. 20, 2022.
Qualcomm Incorporated "Open Issues on BWP" 3GPP TSG RAN WG1 #91 R1-1720693; Dec. 2017.
JP office action in application No. 2021-500933 dated Apr. 20, 2023.
CATT "Discussion on the DRX Timers" 3GPP TSG-RAN WG2 #99bis R2-1710303; Oct. 2017.
Huawei, HiSilicon "HARQ feedback timing for NR" 3GPP TSG RAN WG1 NR Ad Hoc Meeting R1-1709970; Jun. 2017.
KR office action in application No. 10-2021-7001957 dated Aug. 10, 2021.
Non-Final Office Action in U.S. Appl. No. 17/136,574 dated Mar. 31, 2022.
Written Opinion in SG application No. 11202100206T dated Sep. 20, 2022.
EP office action in application No. 19833042.5 dated Apr. 4, 2023.
Huawei, HiSilicon "HARQ RTT timer" 3GPP TSG RAN WG2 #99bis Meeting R2-1710206; Oct. 2017.
ASUSTeK "Issue of monitoring INT-RNTI" 3GPP TSG-RAN WG2 meeting AH-1807 R2-1809505 Jul. 2018.
IN Office action in application No. 202228038667 mailed Nov. 17, 2022.
MediaTek Inc. "Discussion on NR UE Feature List" 3GPP TSG RAN WG1 Ad Hoc Meeting R1-1800153 Jan. 2018.
CATT, CMCC, vivo, CATR, Qualcomm, MediaTek "New SID: Study on UE Power Saving in NR" 3GPP TSG RAN Meetings #80 RP-181463 Jun. 2018.
Written Opinion and ISR in application No. PCT/CN2019/094521 mailed Sep. 26, 2019.
JP office action in application No. 2021-500933 mailed Jan. 31, 2022.
U.S. Appl. No. 62/616,202 (Year: 2018).

* cited by examiner

CONFIGURATION METHOD AND DEVICE

CROSS-REFERENCE TO RELATED APPLICATIONS

This application claims the benefit of and is a continuation application of U.S. patent application Ser. No. 17/136,574 filed on Dec. 29, 2020 which is the continuation application of PCT Application PCT/CN2019/094521 filed on Jul. 3, 2019, which claims the benefit and priority to Chinese Patent Application No. 201810757947.5, filed in China on Jul. 11, 2018, the disclosures of which are incorporated in their entireties by reference herein.

TECHNICAL FIELD

Embodiments of this disclosure relate to the field of communications technologies, and specifically, to a configuration method and a device.

BACKGROUND

The new radio (New Radio, NR) release 15 (release 15, R15) standard specifies parameters related to power saving of a terminal device (for example, user equipment (User Equipment, UE)). Values of the parameters related to power saving lead to different power consumption of the terminal device.

A parameter configuration scheme in the related art is that a base station may directly or indirectly configure the parameters related to power saving for the terminal device. Because there are quite many parameters related to power saving, configuring all the parameters within a short time may cause high signaling overheads.

SUMMARY

One objective of embodiments of this disclosure is to provide a configuration method and a device, to resolve a problem that overheads for configuring parameters related to power saving of a terminal device are high.

According to a first aspect, a configuration method is provided. The method is applied to a terminal device and includes:
  sending a first message to a network-side device, where the first message explicitly or implicitly indicates a power saving mode or a power saving class of the terminal device;
  receiving, from the network-side device, first feedback information about the first message; and
  determining, based on the first feedback information, value(s) of one or more first parameters related to power consumption of the terminal device.

According to a second aspect, a configuration method is further provided. The method is applied to a network-side device and includes:
  receiving a first message from a terminal device, where the first message explicitly or implicitly indicates a power saving mode or a power saving class of the terminal device; and
  sending first feedback information about the first message to the terminal device, so that the terminal device determines, based on the first feedback information, value(s) of one or more first parameters related to power consumption of the terminal device.

According to a third aspect, a configuration method is further provided. The method is applied to a terminal device and includes:
  receiving, from a network-side device, configuration information of a power saving mode or a power saving class of the terminal device; and
  setting, according to the configuration information, value(s) of one or more sixth parameters corresponding to the power saving mode or the power saving class of the terminal device.

According to a fourth aspect, a configuration method is further provided. The method is applied to a network-side device and includes:
  sending configuration information of a power saving mode or a power saving class of a terminal device to the terminal device, so that the terminal device sets value(s) of one or more sixth parameters of the power saving mode or the power saving class of the terminal device according to the configuration information.

According to a fifth aspect, a configuration method is further provided. The method is applied to a terminal device and includes:
  sending a second message to a network-side device, where the second message includes one or more tenth parameters, and the tenth parameter includes at least one of the following: the number of CSI reports simultaneously processable by the terminal device, the number of beam management reports simultaneously processable by the terminal device, the number of measurement resources simultaneously receivable or processable by the terminal device, a CSI report related delay, and a beam management report related delay;
  receiving, from the network-side device, second feedback information about the second message; and
  setting a value of the tenth parameter based on the second feedback information; or performing signal processing based on the second feedback information.

According to a sixth aspect, a configuration method is further provided. The method is applied to a network-side device and includes:
  receiving a second message from a terminal device, where the second message includes one or more tenth parameters, and each tenth parameter includes at least one of the following: the number of CSI reports simultaneously processable by the terminal device, the number of beam management reports simultaneously processable by the terminal device, the number of measurement resources simultaneously receivable or processable by the terminal device, a CSI report related delay, and a beam management report related delay; and
  sending second feedback information about the second message to the terminal device, so that the terminal device sets a value of the tenth parameter based on the second feedback information or performs signal processing based on the second feedback information.

According to a seventh aspect, a terminal device is further provided and includes:
  a first sending module, configured to send a first message to a network-side device, where the first message explicitly or implicitly indicates a power saving mode or a power saving class of the terminal device;
  a first receiving module, configured to receive, from the network-side device, first feedback information about the first message; and a first processing module, configured to determine, based on the first feedback information, value(s) of one or more first parameters related to power consumption of the terminal device.

According to an eighth aspect, a network-side device is further provided and includes:
a second receiving module, configured to receive a first message from a terminal device, where the first message explicitly or implicitly indicates a power saving mode or a power saving class of the terminal device; and
a second sending module, configured to send first feedback information about the first message to the terminal device, so that the terminal device determines, based on the first feedback information, value(s) of one or more first parameters related to power consumption of the terminal device.

According to a ninth aspect, a terminal device is further provided and includes:
a third receiving module, configured to receive, from a network-side device, configuration information of a power saving mode or a power saving class of the terminal device; and
a second processing module, configured to set, according to the configuration information, value(s) of one or more sixth parameters corresponding to the power saving mode or the power saving class of the terminal device.

According to a tenth aspect, a network-side device is further provided and includes:
a third sending module, configured to send configuration information of a power saving mode or a power saving class of a terminal device to the terminal device, so that the terminal device sets value(s) of one or more sixth parameters of the power saving mode or the power saving class of the terminal device according to the configuration information.

According to an eleventh aspect, a terminal device is further provided and includes:
a fourth sending module, configured to send a second message to a network-side device, where the second message includes one or more tenth parameters, and the tenth parameter includes at least one of the following: the number of CSI reports simultaneously processable by the terminal device, the number of beam management reports simultaneously processable by the terminal device, the number of measurement resources simultaneously receivable or processable by the terminal device, a CSI report related delay, and a beam management report related delay;
a fourth receiving module, configured to receive, from the network-side device, second feedback information about the second message; and
a third processing module, configured to set a value of the tenth parameter based on the second feedback information, or perform signal processing based on the second feedback information.

According to a twelfth aspect, a network-side device is further provided and includes:
a fifth receiving module, configured to receive a second message from a terminal device, where the second message includes one or more tenth parameters, and each tenth parameter includes at least one of the following: the number of CSI reports simultaneously processable by the terminal device, the number of beam management reports simultaneously processable by the terminal device, the number of measurement resources simultaneously receivable or processable by the terminal device, a CSI report related delay, and a beam management report related delay; and
a fifth sending module, configured to send second feedback information about the second message to the terminal device, so that the terminal device sets a value of the tenth parameter based on the second feedback information or performs signal processing based on the second feedback information.

According to a thirteenth aspect, a terminal device is further provided and includes a processor, a memory, and a computer program stored in the memory and capable of running on the processor, where when the computer program is executed by the processor, the steps of the configuration method according to the first aspect or the third aspect or the fifth aspect are implemented.

According to a fourteenth aspect, a network-side device is further provided and includes a processor, a memory, and a computer program stored in the memory and capable of running on the processor, where when the computer program is executed by the processor, the steps of the configuration method according to the second aspect or the fourth aspect or the sixth aspect are implemented.

According to a fifteenth aspect, a computer-readable storage medium is further provided, where the computer-readable storage medium stores a computer program, and when the computer program is executed by a processor, the steps of the configuration method according to any one of the first aspect to the sixth aspect are implemented.

In the embodiments of this disclosure, the network-side device configures different power saving modes or power saving classes for the terminal device, for example, configures only different power saving modes or power saving classes for the terminal device; and the terminal device can determine, based on a configured power saving mode or power saving class, a parameter (the parameter may also be referred to as a parameter related to power saving) corresponding to the power saving mode or power saving class and a value of the parameter. Therefore, overheads for signaling transmission in a configuration process are reduced, and a processing delay can be reduced. In addition, the terminal device may further report a power saving mode or a power saving class to the network-side device based on power consumption information of the terminal device, and this helps the terminal device save power.

BRIEF DESCRIPTION OF DRAWINGS

A person of ordinary skill in the art will be clear about other advantages and benefits by reading the following detailed description of optional embodiments. The accompanying drawings are merely intended to illustrate the objectives of the optional embodiments and are not intended to limit this disclosure. Throughout the accompanying drawings, the same reference numerals represent the same components.

DESCRIPTION OF EMBODIMENTS

Figure 1:
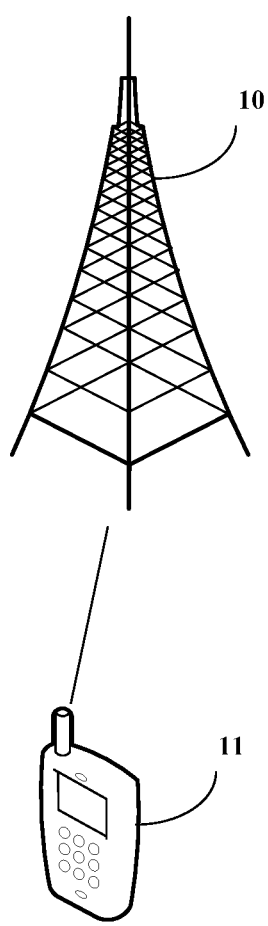
FIG. 1 is a schematic architectural diagram of a wireless communications system according to an embodiment of this disclosure.

The following clearly describes the technical solutions in the embodiments of this disclosure with reference to the accompanying drawings in the embodiments of this disclosure. Apparently, the described embodiments are merely a part rather than all of the embodiments of this disclosure. All other embodiments that a person of ordinary skill in the art obtains based on the embodiments of this disclosure shall fall within the protection scope of this disclosure.

In the specification and claims of this application, the terms "include", and any other variants mean to cover a non-exclusive inclusion, for example, a process, method, system, product, or device that includes a list of steps or units is not necessarily limited to those units, but may include other units not expressly listed or inherent to such a process, method, system, product, or device. In addition, the term "and/or" used in the specification and claims indicates at least one of the connected objects. For example, "A and/or B" represents the following three cases: only A, only B, and both A and B.

In the embodiments of this disclosure, terms such as "an example" or "for example" are used to represent examples, illustrations, or explanations. Any embodiment or design solution described as "an example" or "for example" in the embodiments of this disclosure shall not be interpreted to be more preferential or advantageous than other embodiments or design solutions. Specifically, the terms such as "an example" or "for example" are intended to present related concepts in a specific manner.

For better understanding the technical solutions in the embodiments of this disclosure, the following technical points are first described.

1. Cross-Slot Scheduling (Cross-Slot Scheduling):

The NR R15 standard supports cross-slot scheduling. A principle of cross-slot scheduling is that a spacing between a physical downlink control channel (Physical Downlink Control Channel, PDCCH) and a physical downlink shared channel (Physical Downlink Shared Channel, PDSCH) or physical uplink shared channel (Physical Uplink Shared Channel, PUSCH) scheduled by the PDCCH is N slots (slot), where K0 slots may be configured for the PDSCH, K2 slots may be configured for the PUSCH, K0 and K2 are configured by a base station and are indicated by using downlink control information (Downlink Control Information, DCI), K0 indicates a time interval between the PDCCH and the PDSCH scheduled by the PDCCH, and K2 indicates a time interval between the PDCCH and the PUSCH scheduled by the PDCCH.

An advantage of cross-slot scheduling of the PDSCH is that UE does not need to buffer PDSCH data in advance. After PDCCH decoding, the UE receives PDSCH data according to an indication of the PDCCH, and the UE may selectively and separately turn on or off a radio frequency (Radio Frequency, RF) module and a baseband (Baseband, BB) module to achieve an effect of power saving.

2. PDSCH Processing Delay of UE:

NR supports two UE capabilities with different PDSCH processing delays (N1), that is, a PDSCH processing capability 1 and a PDSCH processing capability 2, which correspond to a UE processing capability 1 and a UE processing capability 2 respectively. The PDSCH processing capability 1 is a basic UE capability, but UE having the PDSCH processing capability 2 has a shorter PDSCH processing delay.

3. PUSCH Preparation Delay of UE:

NR supports two UE capabilities with different PUSCH preparation delays (N2), that is, a PUSCH delay capability 1 and a PUSCH delay capability 2, which correspond to a UE processing capability 1 and a UE processing capability 2 respectively. The PUSCH delay capability 1 is a basic UE capability, but UE having the PUSCH delay capability 2 has a shorter PUSCH preparation delay.

The following describes the embodiments of this disclosure with reference to the accompanying drawings. A configuration method and a device provided in the embodiments of this disclosure may be applied to a wireless communications system. The wireless communications system may be a 5G system, or an evolved long term evolution (Evolved Long Term Evolution, eLTE) system, or a subsequent evolved communications system. FIG. 1 is a schematic architectural diagram of a wireless communications system according to an embodiment of this disclosure. As shown in FIG. 1, the wireless communications system may include a network-side device 10 and a terminal device. For example, the terminal device is marked as UE 11. The UE 11 may perform communication (signaling transmission or data transmission) with the network-side device 10. In an actual application, a connection between the foregoing devices may be a wireless connection. To conveniently and visually represent a connection relationship between the devices, a solid line is used in FIG. 1.

It should be noted that the communications system may include a plurality of UEs 11, and the network-side device 10 may communicate with the plurality of UEs 11.

The network-side device 10 provided by this embodiment of this disclosure may be a base station, and the base station may be a generally used base station, or may be an evolved base station (evolved node base station, eNB), or may be a device such as a network-side device (for example, a next generation base station (next generation node base station, gNB)) or a transmission and reception point (transmission and reception point, TRP) in a 5G system.

The terminal device provided by this embodiment of this disclosure may be a mobile phone, a tablet computer, a notebook computer, an ultra-mobile personal computer (Ultra-Mobile Personal Computer, UMPC), a netbook, a personal digital assistant (Personal Digital Assistant, PDA), or the like.

Figure 2:
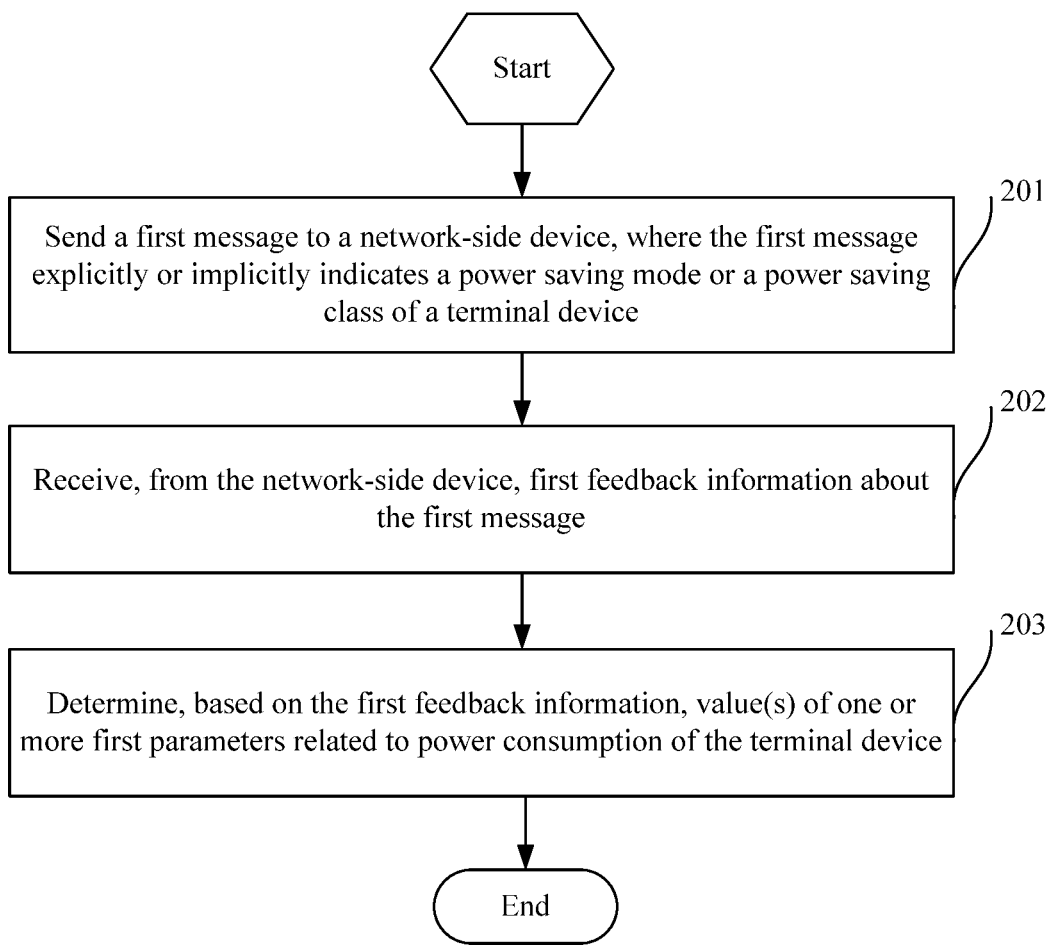
FIG. 2 is a flowchart 1 of a configuration method according to an embodiment of this disclosure.

Referring to FIG. 2, an embodiment of this disclosure provides a configuration method. The method is performed by a terminal device, for example, UE. Specific steps include step 201, step 202, and step 203.

Step 201: Send a first message to a network-side device, where the first message explicitly or implicitly indicates a power saving mode or a power saving class of the terminal device.

Optionally, in step 201, the terminal device may send the first message to the network-side device based on power consumption information of the terminal device, where the power consumption information of the terminal device may be used to indicate a power saving requirement of the terminal device. For example, the power consumption information of the terminal device may be information such as remaining power of the terminal device, or whether the terminal device is overheated, or a temperature measured by a sensor of the terminal device.

Optionally, the power saving mode (power saving mode) may include a power saving mode 1, a power saving mode 2, a power saving mode 3, a power saving mode 4, . . . , or the like, where parameters corresponding to the power saving modes and values of the parameters may be the same or may be different. It may be understood that a parameter corresponding to a power saving mode and a value of the parameter are not specifically limited in this embodiment of this disclosure.

Optionally, the power saving class (power saving class) may include a power saving class 1, a power saving class 2, a power saving class 3, a power saving class 4, . . . , or the like, where parameters corresponding to the power saving classes and values of the parameters may be the same or may be different. It may be understood that a parameter corresponding to a power saving class and a value of the parameter are not specifically limited in this embodiment of this disclosure.

Optionally, the first message may include the power consumption information of the terminal device, for example, information such as the remaining power of the terminal device, or whether the terminal device is overheated, or the temperature measured by the sensor of the terminal device.

Step 202: Receive, from the network-side device, first feedback information about the first message.

Optionally, the first feedback information may include one or more of the following: an acknowledgment (Acknowledgment, ACK) or a negative acknowledgment (Negative Acknowledgment, NACK) of the first message; an identity of a power saving mode or a power saving class configured by the network-side device for the terminal device; and one or more second parameters configured by the network-side device for the terminal device and a value of each second parameter, where the second parameter is related to power consumption of the terminal device.

It may be understood that the power saving mode or power saving class configured by the network-side device for the terminal device and fed back by using the first feedback information may be the same or different from the power saving mode or power saving class explicitly or implicitly indicated by the first message. For example, the power saving mode or power saving class explicitly or implicitly indicated by the first message and required by the terminal device is the power saving mode 1 or the power saving class 1, but the power saving mode or power saving class configured by the network-side device for the terminal device and fed back by using the first feedback information is the power saving mode 2 or the power saving class 2, where the power saving mode 2 or the power saving class 2 better satisfies the power saving requirement of the terminal device and helps the terminal device save power.

Step 203: Determine, based on the first feedback information, value(s) of one or more first parameters related to power consumption of the terminal device.

It may be understood that the first parameter may be a parameter related to power saving and used for controlling power consumption of the terminal device. This is not specifically limited herein.

Optionally, the first message in this embodiment of this disclosure may be in any one of the following formats:

(1) The first message includes a first field, and a value of the first field corresponds to value(s) of one or more third parameters, where the third parameter is a related parameter for controlling power consumption of the terminal device, that is, is related to power consumption of the terminal device. The third parameter is not described herein. For details, refer to the description about the first parameter.

For example, the first message includes two bits (bit), and meanings thereof are shown in Table 2.

| First field | Parameter A | Parameter B | Parameter C |
| --- | --- | --- | --- |
| 00 | A1 | B1 | C1 |
| 01 | A2 | B2 | C2 |
| 10 | A3 | B2 | C3 |
| 11 | A3 | B2 | C4 |

The third parameter in Table 2 includes parameter A, parameter B, parameter C, and values of parameter A, parameter B, and parameter C, where parameter A, parameter B, and parameter C are related to power consumption of the terminal device.

Optionally, the third parameter and the value of the third parameter may be configured by the network-side device or prescribed by a protocol.

(2) The first message includes a second field, and a value of the second field corresponds to value(s) of one or more fourth parameters of a power saving mode or a power saving class. Optionally, the fourth parameter and the value of the fourth parameter may be configured by the network-side device or prescribed by a protocol. The fourth parameter is not described herein. For details, refer to the description about the first parameter.

For example, the first message includes two bits, and meanings thereof are shown in Table 3.

| Second field | Power saving mode or power saving class | Parameter A | Parameter B | Parameter C |
| --- | --- | --- | --- | --- |
| 00 | 1 | A1 | B1 | C1 |
| 01 | 2 | A2 | B2 | C2 |
| 10 | 3 | A3 | B2 | C3 |
| 11 | 4 | A3 | B2 | C4 |

Table 3 shows four power saving modes or power saving classes. Certainly, this is not limited. The fourth parameters may include parameter A, parameter B, parameter C, and values of parameter A, parameter B, and parameter C.

It may be understood that values of parameters corresponding to the power saving modes or power saving classes may be the same or may be different. For example, in Table 3, a value of parameter A of the power saving mode (or power saving class) 3 is the same as a value of parameter A of the power saving mode (or power saving class) 4; and a value of parameter B of the power saving mode (or power saving class) 2 is the same as a value of parameter B of the power saving mode (or power saving class) 4.

(3) The first message includes a third field, the third field includes one or more first bit strings, and a value of each first bit string corresponds to a value of a fifth parameter, where the fifth parameter is related to power consumption of the terminal device. The fifth parameter is not described herein. For details, refer to the description about the first parameter.

For example, the first message may include the following field, where the field includes 12 bits (4 bits+5 bits+3 bits) in total, and meanings thereof are shown in Table 4.

| A bit string of 4 bits, where different states of the bit string indicate different values of parameter A | A bit string of 5 bits, where different states of the bit string indicate different values of parameter B | A bit string of 3 bits, where different states of the bit string indicate different values of parameter C |
|---|---|---|

Optionally, the fifth parameter and the value of the fifth parameter may be configured by the network-side device or prescribed by a protocol.

It may be understood that the first parameter, the second parameter, the third parameter, the fourth parameter, and the fifth parameter may be the same or may be different.

Optionally, the first parameter, the second parameter, the third parameter, the fourth parameter, or the fifth parameter may include at least one of the following:
the number of transmit antennas or transmit channels of the terminal device;
the number of receive antennas or receive channels of the terminal device;
the number of simultaneously activated uplink component carriers (Component Carrier, CC);
the number of simultaneously activated downlink component carriers;
a time interval between a physical downlink control channel (Physical Downlink Control Channel, PDCCH) and a physical downlink shared channel (Physical Downlink Shared Channel, PDSCH) scheduled by the PDCCH, for example, a parameter K0;
a time interval between a PDSCH and a corresponding ACK or NACK, for example, a parameter K1;
a time interval between a PDCCH and a physical uplink shared channel (Physical Uplink Shared Channel, PUSCH) scheduled by the PDCCH, for example, a parameter K2;
a PDSCH processing delay, for example, a parameter N1;
a PUSCH preparation delay, for example, a parameter N2;
the number of downlink multiple-input multiple-output (Multiple-Input Multiple-Output, MIMO) layers (layer);
the number of uplink MIMO layers;
a PDCCH monitoring (monitoring) period;
a PDCCH monitoring offset (offset);
PDCCH monitoring duration (duration);
a discontinuous reception (Discontinuous Reception, DRX) cycle, where optionally, the first parameter, the second parameter, the third parameter, the fourth parameter, or the fifth parameter may further include other DRX-related parameters, for example, a duration timer onDurationTimer parameter, an inactivity timer InactivityTimer parameter, a long cycle related parameter, a short cycle related parameter, and a retransmission related parameter;
a bandwidth of a bandwidth part (Band Width Part, BWP);
an identity (Identity, ID) of a BWP;
dual connectivity (Dual Connectivity, DC);
non-dual connectivity (non-DC);
a maximum uplink transmission rate;
a maximum downlink transmission rate;
the number of channel state information (Channel State Information, CSI) reports (report) simultaneously processable by the terminal device, where the CSI report may include a channel quality indicator (Channel Quality Indicator, CQI), a precoding matrix indicator (precoding matrix indicator, PMI), a channel state information reference signal resource indicator (CSI-RS (Channel State Information Reference Signal) resource indicator, CRI), a synchronization signal or physical broadcast channel block resource indicator (Synchronization Signal/Physical Broadcast Channel Block Resource Indicator, SSBRI), a layer indicator (Layer Indicator, LI), a rank indicator (Rank Indicator, RI), and/or layer 1 reference signal received power (Layer 1 Reference Signal Received Power, L1-RSRP), or the like;
the number of beam management reports (beam management report) simultaneously processable by the terminal device, where the beam management report may include a CRI, RSRP, and/or an SSBRI, or the like;
the number of measurement resources simultaneously receivable or processable by the terminal device, where the measurement resource may be at least one of the following: a CSI-RS resource; a synchronization signal or physical broadcast channel block (Synchronization Signal/Physical Broadcast Channel Block, SSB) resource; and a CSI-RS resource and an SSB resource;
a CSI report (CSI report) related delay, where the delay includes at least one of the following: a delay between a time of receiving signaling by the terminal device for triggering a channel state information reference signal (Channel State Information Reference Signal, CSI-RS) report and a reporting time of a corresponding CSI report, and a delay between a time of measuring a CSI-RS by the terminal device and a reporting time of a corresponding CSI report; and
a beam management report (beam management report) related delay, where the delay includes at least one of the following: a delay between a time of receiving signaling by the terminal device for triggering a beam management report and a reporting time of a corresponding beam management report, and a delay between a time of measuring a CSI-RS by the terminal device and a reporting time of a corresponding beam management report.

In this embodiment of this disclosure, the network-side device only needs to configure different power saving modes or power saving classes for the terminal device; and the terminal device can determine, based on a configured power saving mode or power saving class, a parameter corresponding to the power saving mode or power saving class and a value of the parameter. Therefore, overheads for signaling transmission in a configuration process are reduced, and a processing delay can be reduced. In addition, the terminal device may further report a power saving mode or a power saving class to the network-side device based on power consumption information of the terminal device, and this helps the terminal device save power.

Figure 3:
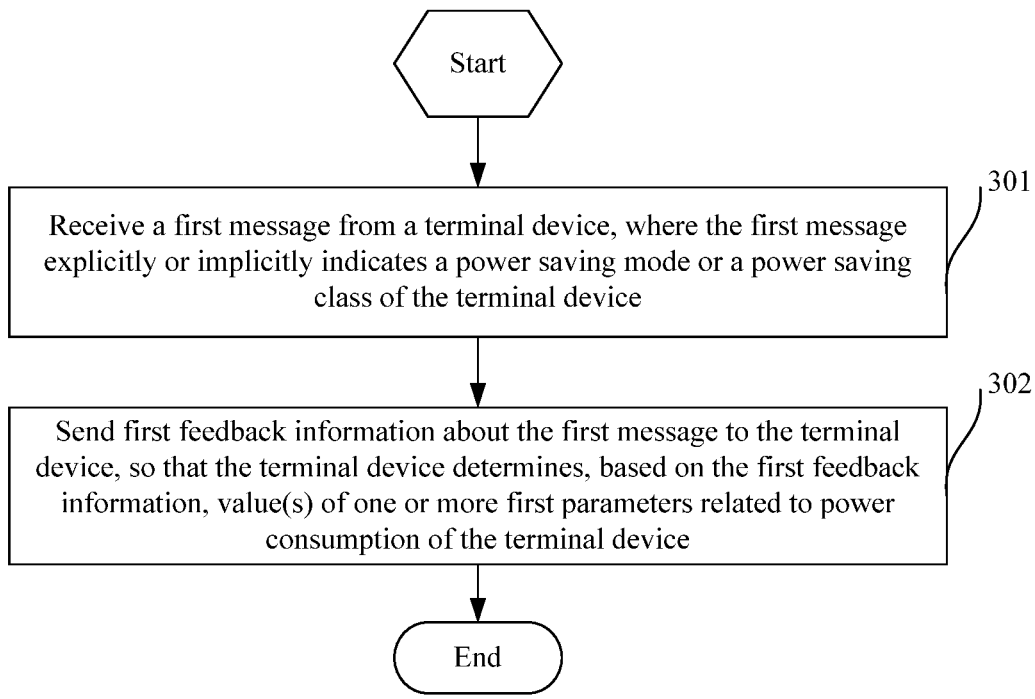
FIG. 3 is a flowchart 2 of a configuration method according to an embodiment of this disclosure.

Referring to FIG. 3, an embodiment of this disclosure further provides a configuration method. The method is performed by a network-side device, for example, a base station. Specific steps are as follows:

Step 301: Receive a first message from a terminal device, where the first message explicitly or implicitly indicates a power saving mode or a power saving class of the terminal device.

Step 302: Send first feedback information about the first message to the terminal device, so that the terminal device determines, based on the first feedback information, value(s) of one or more first parameters related to power consumption of the terminal device.

It may be understood that descriptions about the first message, the first feedback information, the first parameter, a second parameter, a third parameter, a fourth parameter, and a fifth parameter in the embodiment shown in FIG. 3 are the same as the descriptions about the first message, the first feedback information, the first parameter, the second parameter, the third parameter, the fourth parameter, and the fifth parameter in the embodiment shown in FIG. 2. Details are not described again herein.

In this embodiment of this disclosure, the network-side device may configure different power saving modes or power saving classes for the terminal device based on the power saving mode or power saving class reported by the terminal device; and the terminal device can determine, based on a configured power saving mode or power saving class, a parameter corresponding to the power saving mode or power saving class and a value of the parameter. Therefore, overheads for signaling transmission in a configuration process are reduced and a delay is reduced, and this helps the terminal device save power.

Figure 4:
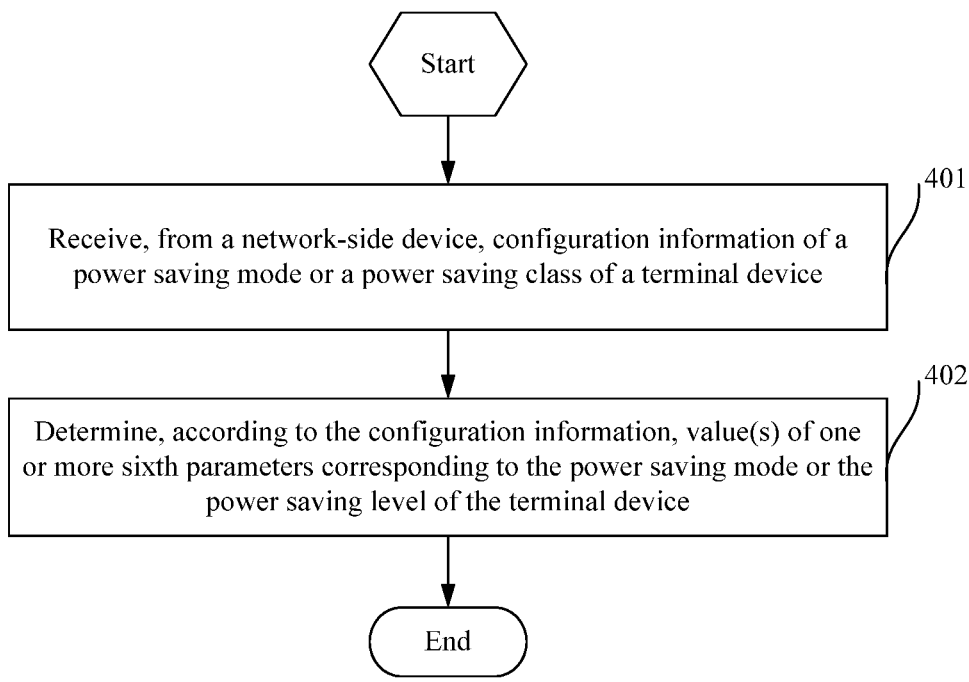
FIG. 4 is a flowchart 3 of a configuration method according to an embodiment of this disclosure.

Referring to FIG. 4, an embodiment of this disclosure further provides a configuration method. The method may be performed by a terminal device, for example, UE. Specific steps include step 401 and step 402.

Step 401: Receive, from a network-side device, configuration information of a power saving mode or a power saving class of the terminal device.

It may be understood that the configuration information may explicitly or implicitly indicate the power saving mode or the power saving class of the terminal device.

Optionally, the terminal device may receive, by using radio resource control (Radio Resource Control, RRC) signaling, media access control (Media Access Control, MAC) signaling, or PDCCH signaling, the configuration information of the power saving mode or power saving class configured by the network-side device for the terminal device. Certainly, it may be understood that a manner of reporting the configuration information is not specifically limited in this embodiment of this disclosure.

Optionally, the configuration information of the power saving mode in step 401 may be an identity or other information of any one of a power saving mode 1, a power saving mode 2, a power saving mode 3, a power saving mode 4, . . . , and the like. It may be understood that parameters corresponding to the power saving modes and values of the parameters may be the same or may be different. A parameter corresponding to a power saving mode and a value of the parameter are not specifically limited in this embodiment of this disclosure.

Optionally, the configuration information of the power saving class in step 401 may be an identity or other information of any one of a power saving class 1, a power saving class 2, a power saving class 3, a power saving class 4, . . . , and the like. It may be understood that parameters corresponding to the power saving classes and values of the parameters may be the same or may be different. A parameter corresponding to a power saving mode and a value of the parameter are not specifically limited in this embodiment of this disclosure.

Step 402: Set, according to the configuration information, value(s) of one or more sixth parameters corresponding to the power saving mode or the power saving class of the terminal device.

Optionally, the configuration information includes a fourth field, and a value of the fourth field corresponds to value(s) of one or more seventh parameters, where the seventh parameter is related to power consumption of the terminal device.

For example, the configuration information includes two bits (bit), and meanings thereof are shown in Table 5.

| Fourth field | Parameter A | Parameter B | Parameter C |
| --- | --- | --- | --- |
| 00 | A1 | B1 | C1 |
| 01 | A2 | B2 | C2 |
| 10 | A3 | B2 | C3 |
| 11 | A3 | B2 | C4 |

The seventh parameter in Table 5 includes parameter A, parameter B, parameter C, and values of parameter A, parameter B, and parameter C, where parameter A, parameter B, and parameter C are related to power consumption of the terminal device. It may be understood that the seventh parameter and the value of the seventh parameter may be configured by the network-side device or prescribed by a protocol.

Optionally, the configuration information includes a fifth field, and a value of the fifth field corresponds to value(s) of one or more eighth parameters of a power saving mode or a power saving class.

For example, the configuration information includes two bits, and meanings thereof are shown in Table 6.

| Fifth field | Power saving mode or power saving class | Parameter A | Parameter B | Parameter C |
| --- | --- | --- | --- | --- |
| 00 | 1 | A1 | B1 | C1 |
| 01 | 2 | A2 | B2 | C2 |
| 10 | 3 | A3 | B2 | C3 |
| 11 | 4 | A3 | B2 | C4 |

Table 6 shows four power saving modes or power saving classes. Certainly, this is not limited. The eighth parameters may include parameter A, parameter B, parameter C, and values of parameter A, parameter B, and parameter C. Optionally, the eighth parameter and the value of the eighth parameter may be configured by the network-side device or prescribed by a protocol.

It may be understood that values of parameters corresponding to the power saving modes or power saving classes may be the same or may be different. For example, in Table 6, a value of parameter A of the power saving mode (or power saving class) 3 is the same as a value of parameter A of the power saving mode (or power saving class) 4; and a value of parameter B of the power saving mode (or power saving class) 2 is the same as a value of parameter B of the power saving mode (or power saving class) 4.

Optionally, the configuration information includes a sixth field, the sixth field includes one or more second bit strings, and a value of each second bit string corresponds to a value of a ninth parameter, where the ninth parameter is related to power consumption of the terminal device. Optionally, the ninth parameter and the value of the ninth parameter may be configured by the network-side device or prescribed by a protocol.

For example, the configuration information may include the following field, where the field includes 12 bits (4 bits+5 bits+3 bits) in total, and meanings thereof are shown in Table 7.

| A bit string of 4 bits, where different states of the bit string indicate different values of parameter A | A bit string of 5 bits, where different states of the bit string indicate different values of parameter B | A bit string of 3 bits, where different states of the bit string indicate different values of parameter C |
| --- | --- | --- |

It may be understood that the sixth parameter, the seventh parameter, the eighth parameter, and the ninth parameter may be the same or may be different.

Optionally, the sixth parameter, the seventh parameter, the eighth parameter, or the ninth parameter may include at least one of the following:
- the number of transmit antennas or transmit channels of the terminal device;
- the number of receive antennas or receive channels of the terminal device;
- the number of simultaneously activated uplink component carriers (Component Carrier, CC);
- the number of simultaneously activated downlink component carriers;
- a time interval between a physical downlink control channel (Physical Downlink Control Channel, PDCCH) and a physical downlink shared channel (Physical Downlink Shared Channel, PDSCH) scheduled by the PDCCH, for example, a parameter K0;
- a time interval between a PDSCH and an ACK or a NACK, for example, a parameter K1;
- a time interval between a PDCCH and a physical uplink shared channel (Physical Uplink Shared Channel, PUSCH) scheduled by the PDCCH, for example, a parameter K2;
- a PDSCH processing delay, for example, a parameter N1;
- a PUSCH preparation delay, for example, a parameter N2;
- the number of downlink multiple-input multiple-output (Multiple-Input Multiple-Output, MIMO) layers (layer);
- the number of uplink MIMO layers;
- a PDCCH monitoring (monitoring) period;
- a PDCCH monitoring offset (offset); PDCCH monitoring duration (duration);
- a discontinuous reception (Discontinuous Reception, DRX) cycle, where optionally, the first parameter, the second parameter, the third parameter, the fourth parameter, or the fifth parameter may further include other DRX-related parameters, for example, a duration timer onDurationTimer parameter, an inactivity timer InactivityTimer parameter, a long cycle related parameter, a short cycle related parameter, and a retransmission related parameter;
- a bandwidth of a bandwidth part (Band Width Part, BWP);
- an identity (Identity, ID) of a BWP;
- dual connectivity (Dual Connectivity, DC);
- non-dual connectivity (non-DC);
- a maximum uplink transmission rate;
- a maximum downlink transmission rate;
- the number of channel state information (Channel State Information, CSI) reports (report) simultaneously processable by the terminal device, where the CSI report may include a channel quality indicator (Channel Quality Indicator, CQI), a precoding matrix indicator (precoding matrix indicator, PMI), a channel state information reference signal resource indicator (CSI-RS resource indicator, CRI), a synchronization signal or physical broadcast channel block resource indicator (Synchronization Signal/Physical Broadcast Channel Block Resource Indicator, SSBRI), a layer indicator (Layer Indicator, LI), a rank indicator (Rank Indicator, RI), and/or layer 1 reference signal received power (Layer 1 Reference Signal Received Power, L1-RSRP), or the like;
- the number of beam management reports (beam management report) simultaneously processable by the terminal device, where the beam management report may include a CRI, RSRP, and/or an SSBRI, or the like;
- the number of measurement resources simultaneously receivable or processable by the terminal device, where the measurement resource may be at least one of the following: a CSI-RS resource; an SSB resource; and a CSI-RS resource and an SSB resource;
- a CSI report (report) related delay, where the delay includes at least one of the following: a delay between a time of receiving signaling by the terminal device for triggering a channel state information reference signal (Channel State Information Reference Signal, CSI-RS) report and a reporting time of a corresponding CSI report, and a delay between a time of measuring a CSI-RS by the terminal device and a reporting time of a corresponding CSI report; and
- a beam management report (beam management report) related delay, where the delay includes at least one of the following: a delay between a time of receiving signaling by the terminal device for triggering a beam management report and a time of a corresponding beam management report, and a delay between a time of measuring a CSI-RS by the terminal device and a time of a corresponding beam management report.

In this embodiment of this disclosure, the network-side device only needs to configure different power saving modes or power saving classes for the terminal device; and the terminal device can determine, based on a configured power saving mode or power saving class, a parameter corresponding to the power saving mode or power saving class and a value of the parameter. Therefore, overheads for signaling transmission in a configuration process are reduced, and a delay can be reduced.

Figure 5:
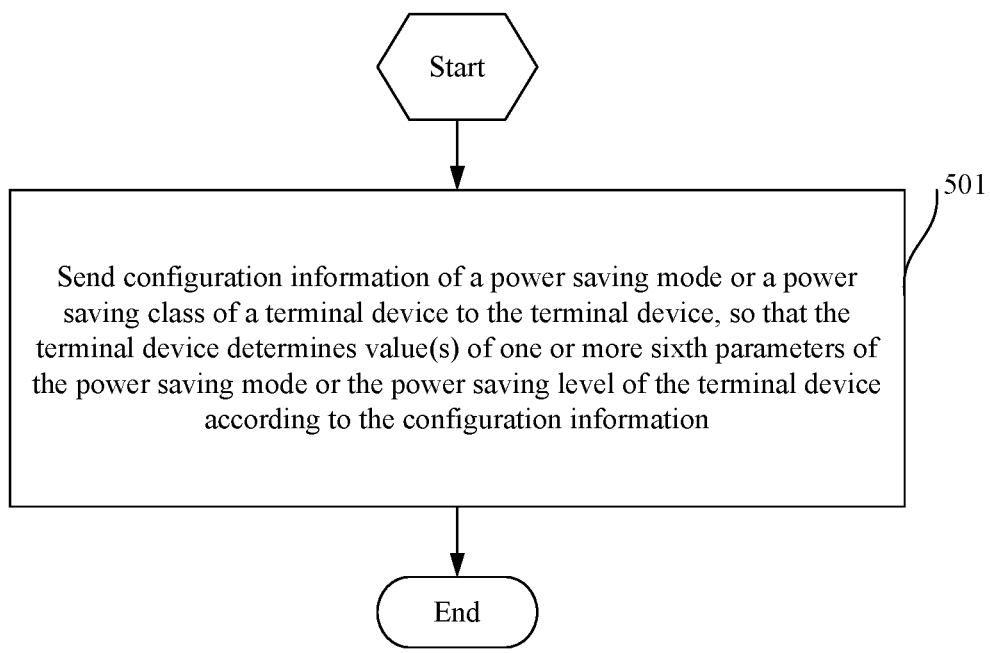
FIG. 5 is a flowchart 4 of a configuration method according to an embodiment of this disclosure.

Referring to FIG. 5, an embodiment of this disclosure further provides a configuration method. The method is performed by a network-side device. A specific step is as follows:

Step 501: Send configuration information of a power saving mode (power saving mode) or a power saving class (power saving class) of a terminal device to the terminal device, so that the terminal device sets value(s) of one or more sixth parameters of the power saving mode or the power saving class of the terminal device according to the configuration information.

It may be understood that for the configuration information of the power saving mode or the power saving class in the embodiment shown in FIG. 5, reference may be made to the configuration information of the power saving mode or the power saving class in the embodiment shown in FIG. 4. Details are not described again herein.

Optionally, the network-side device may send the configuration information of the power saving mode or the power saving class of the terminal device to the terminal device by using RRC signaling, MAC signaling, or PDCCH signaling. Certainly, it may be understood that a manner of delivering the configuration information is not specifically limited in this embodiment of this disclosure.

It may be understood that for the sixth parameter, a seventh parameter, an eighth parameter, and a ninth parameter in the embodiment shown in FIG. 5, reference may be made to the sixth parameter, the seventh parameter, the eighth parameter, and the ninth parameter in the embodiment shown in FIG. 4. Details are not described again herein.

In this embodiment of this disclosure, the network-side device only needs to configure different power saving modes or power saving classes for the terminal device; and the terminal device can determine, based on a configured power saving mode or power saving class, a parameter corresponding to the power saving mode or power saving class and a value of the parameter. Therefore, overheads for signaling transmission in a configuration process are reduced, and a delay can be reduced.

Figure 6:
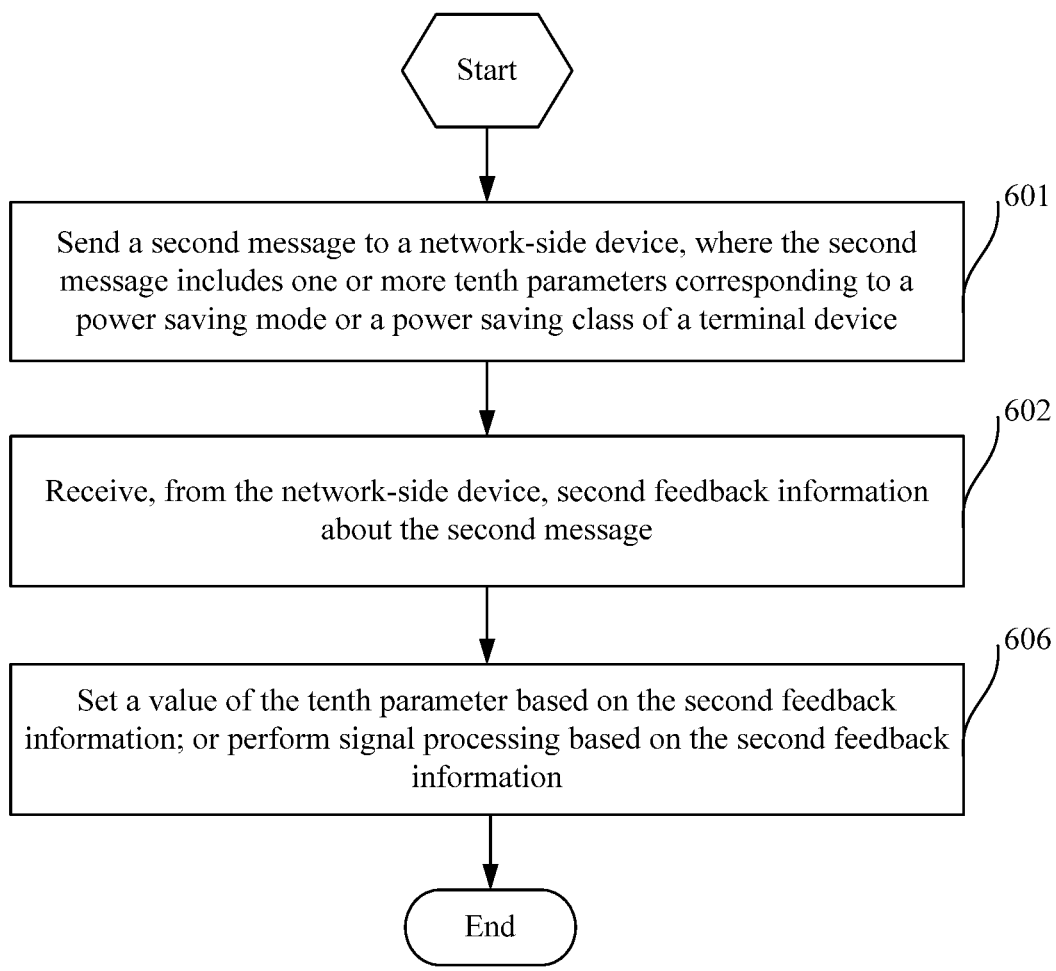
FIG. 6 is a flowchart 5 of a configuration method according to an embodiment of this disclosure.

Referring to FIG. 6, an embodiment of this disclosure further provides a configuration method. The method is performed by a terminal device, for example, UE. Specific steps include step 601, step 602, and step 603.

Step 601: Send a second message to a network-side device, where the second message includes one or more tenth parameters, and the tenth parameter includes at least one of the following: the number of CSI reports (CSI report) simultaneously processable by the terminal device, the number of beam management reports (beam management report) simultaneously processable by the terminal device, the number of measurement resources simultaneously receivable or processable by the terminal device, a CSI report (CSI report) related delay, and a beam management report (beam management report) related delay.

Step 602: Receive, from the network-side device, second feedback information about the second message.

The CSI report may include a channel quality indicator (Channel Quality Indicator, CQI), a precoding matrix indicator (precoding matrix indicator, PMI), a channel state information reference signal resource indicator (CSI-RS (Channel State Information Reference Signal) resource indicator, CRI), a synchronization signal or physical broadcast channel block resource indicator (Synchronization Signal/Physical Broadcast Channel Block Resource Indicator, SSBRI), a layer indicator (Layer Indicator, LI), a rank indicator (Rank Indicator, RI), and/or layer 1 reference signal received power (Layer 1 Reference Signal Received Power, L1-RSRP), or the like.

The beam management report may include a CRI, RSRP, and/or an SSBRI, or the like.

Optionally, the CSI report related delay includes at least one of the following: a delay between a time of receiving signaling by the terminal device for triggering a channel state information reference signal (Channel State Information Reference Signal, CSI-RS) report and a reporting time of a corresponding CSI report, and a delay between a time of measuring a CSI-RS by the terminal device and a reporting time of a corresponding CSI report.

Optionally, the beam management report related delay may include at least one of the following: a delay between a time of receiving signaling by the terminal device for triggering a beam management report and a time of a corresponding beam management report, and a delay between a time of measuring a CSI-RS by the terminal device and a time of a corresponding beam management report.

Optionally, the second feedback information may include at least one of the following: an ACK or a NACK of the second message; and a value of the at least one tenth parameter configured by the network-side device for the terminal device.

Step 603: Set the value of the tenth parameter based on the second feedback information; or perform signal processing based on the second feedback information.

In this embodiment of this disclosure, the terminal device directly reports one or more tenth parameters corresponding to a power saving mode or a power saving class of the terminal device to the network-side device; and then the terminal device may determine the value of the tenth parameter of the terminal device based on the second feedback information of the network-side device, or perform signal processing based on the second feedback information. Therefore, the terminal device can know values of related parameters at one time. In comparison with a method in the related art, this method can reduce signaling overheads and reduce a processing delay.

Figure 7:
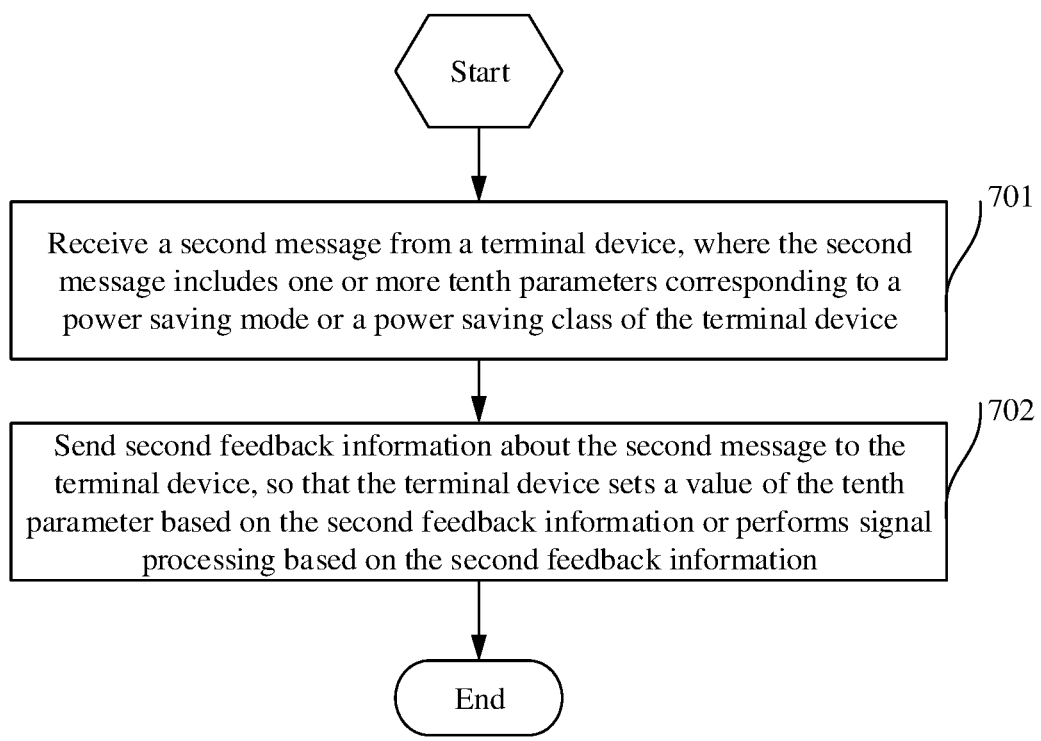
FIG. 7 is a flowchart 6 of a configuration method according to an embodiment of this disclosure.

Referring to FIG. 7, an embodiment of this disclosure further provides a configuration method. The method is performed by a network-side device, for example, a base station. Specific steps are as follows:

Step 701: Receive a second message from a terminal device, where the second message includes one or more tenth parameters, and each tenth parameter includes at least one of the following: the number of CSI reports (CSI report) simultaneously processable by the terminal device, the number of beam management reports (beam management report) simultaneously processable by the terminal device, the number of measurement resources simultaneously receivable or processable by the terminal device, a CSI report (CSI report) related delay, and a beam management report (beam management report) related delay.

Step 702: Send second feedback information about the second message to the terminal device, so that the terminal device sets a value of the tenth parameter based on the second feedback information or performs signal processing based on the second feedback information.

Optionally, the CSI report related delay includes at least one of the following: a delay between a time of receiving signaling by the terminal device for triggering a channel state information reference signal (Channel State Information Reference Signal, CSI-RS) report and a reporting time of a corresponding CSI report, and a delay between a time of measuring a CSI-RS by the terminal device and a reporting time of a corresponding CSI report.

Optionally, the beam management report related delay may include at least one of the following: a delay between a time of receiving signaling by the terminal device for triggering a beam management report and a time of a corresponding beam management report, and a delay between a time of measuring a CSI-RS by the terminal device and a time of a corresponding beam management report.

Optionally, the second feedback information may include at least one of the following: an ACK or a NACK of the second message; and the value of the at least one tenth parameter configured by the network-side device for the terminal device.

In this embodiment of this disclosure, the terminal device directly reports one or more tenth parameters corresponding to a power saving mode or a power saving class of the terminal device to the network-side device; and then the terminal device may set, based on the second feedback information of the network-side device, the value of the tenth parameter corresponding to the power saving mode or the power saving class of the terminal device, or perform signal processing based on the second feedback information. Therefore, the terminal device can know values of related parameters at one time. In comparison with a method in the related art, this method can reduce signaling overheads and reduce a processing delay.

For better understanding the embodiments of this disclosure, the following describes a procedure on a terminal device side with reference to examples 1 to 3. In the examples 1 to 3, for example, a terminal device is UE, and a network-side device is a base station.

Example 1

Step 1: UE reports a power saving mode (power saving mode) or a power saving class (power saving class).

Step 2: The UE receives feedback information from a base station, where the feedback information is an acknowledgment (ACK) or a negative acknowledgment (NACK) by the base station for the power saving mode or power saving class reported by the UE, or is signaling for configuring a parameter of a power saving mode or a power saving class by the base station, for example, including the parameter corresponding to the power saving mode or the power saving class configured by the base station and a value of the parameter.

Step 3: The UE configures the parameter of the power saving mode or the power saving class based on the feedback information of the base station.

Example 2

Step 1: UE receives configuration information of a power saving mode (power saving mode) or a power saving class (power saving class) from a base station.

Step 2: The UE configures a parameter of the power saving mode or the power saving class according to the configuration information.

Power saving mode or power saving class:

A plurality of power saving modes (power saving mode X) or power saving classes (power saving class X) (X=1, 2, . . . , N):

power saving mode 1: a value of parameter A is a1, a value of parameter B is b1, . . . , and a value of parameter M is m1;
—power saving mode 2: a value of parameter A is a2, a value of parameter B is b2, . . . , and a value of parameter M is m2;

It may be understood that the base station may configure a parameter list corresponding to each power saving mode or power saving class, and a value of each parameter. Certainly, this is not limited.

Optionally, the parameter of the power saving mode or the power saving class may include one or more of the following:

the number of transmit antennas or transmit channels of the UE;
the number of receive antennas or receive channels of the UE;
the number of simultaneously activated uplink CCs;
the number of simultaneously activated downlink CCs;
a parameter K0/K1/K2;
a parameter N1/N2;

a delay between receiving configuration of a CSI-RS and reporting CSI by the UE, or a delay between measuring a CSI-RS and reporting CSI by the UE;
the number of downlink MIMO layers;
the number of uplink MIMO layers;
a PDCCH monitoring period/offset/duration;
a bandwidth of a BWP or an ID of a BWP; DC or non-DC;
a maximum uplink rate or a maximum downlink rate;
the number of CSI reports or beam management reports simultaneously processable;
the number of measurement resources simultaneously receivable or processable; and
a CSI report related delay or a beam management report related delay.

Example 3

Step 1: UE may report one or more of the following to a base station:

the number of CSI reports or beam management reports simultaneously processable;
the number of measurement resources simultaneously receivable or processable; and
a CSI report related delay or a beam management report related delay.

Step 2: The UE receives feedback information from the base station, where the feedback information is an ACK or a NACK by the base station for content reported by the UE, or is signaling for setting a value of a reported parameter by the base station.

Step 3: The UE configures a parameter or performs processing based on the feedback information of the base station.

An embodiment of this disclosure further provides a terminal device. Because a problem resolving principle of the terminal device is similar to that of a configuration method in an embodiment of this disclosure, for implementation of the terminal device, refer to the implementation of the method. Details are not described again herein.

Figure 8:
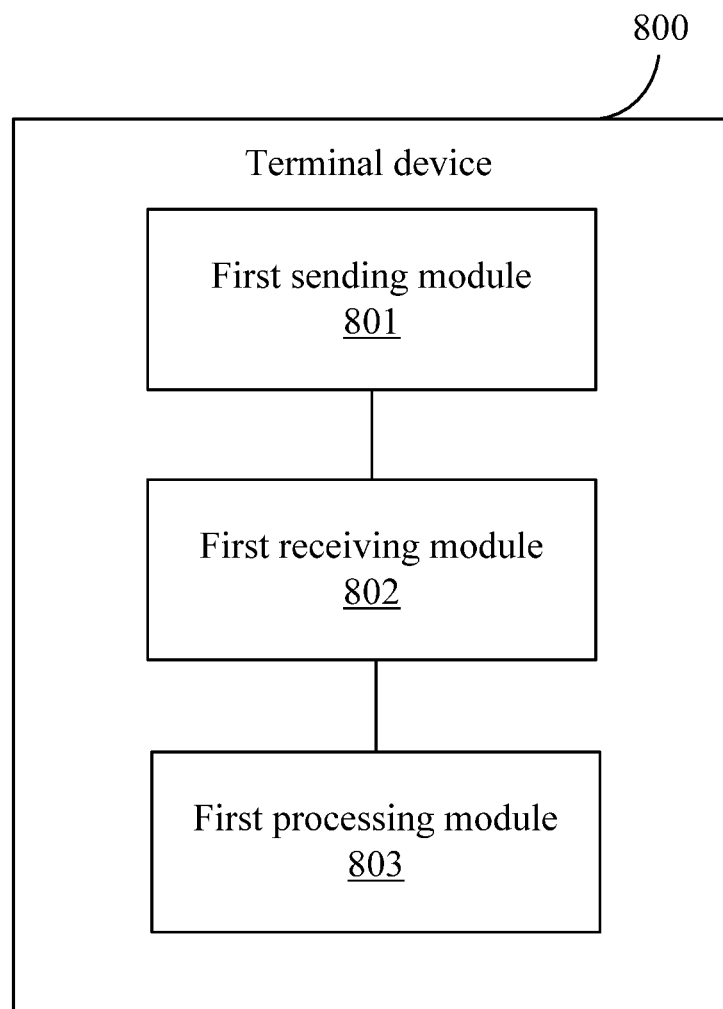
FIG. 8 is a schematic structural diagram 1 of a terminal device according to an embodiment of this disclosure.

Referring to FIG. 8, an embodiment of this disclosure further provides a terminal device. The terminal device 800 includes:

a first sending module 801, configured to send a first message to a network-side device, where the first message explicitly or implicitly indicates a power saving mode or a power saving class of the terminal device;
a first receiving module 802, configured to receive, from the network-side device, first feedback information about the first message; and
a first processing module 803, configured to determine, based on the first feedback information, value(s) of one or more first parameters related to power consumption of the terminal device.

In this embodiment of this disclosure, optionally, the first sending module 801 is specifically configured to send the first message to the network-side device based on power consumption information of the terminal device.

In this embodiment of this disclosure, optionally, the first feedback information includes one or more of the following:

an ACK or a NACK of the first message;
an identity of a power saving mode or a power saving class configured by the network-side device for the terminal device; and value(s) of one or more second parameters configured by the network-side device for the terminal device, where the second parameter is related to power consumption of the terminal device.

In this embodiment of this disclosure, optionally, the first message includes a first field, and a value of the first field corresponds to value(s) of one or more third parameters, where the third parameter is related to power consumption of the terminal device; or
  the first message includes a second field, and a value of the second field corresponds to value(s) of one or more fourth parameters of a power saving mode or a power saving class; or
  the first message includes a third field, the third field includes one or more first bit strings, and a value of each first bit string corresponds to a value of a fifth parameter, where the fifth parameter is related to power consumption of the terminal device.

In this embodiment of this disclosure, optionally, the third parameter and the value of the third parameter are configured by the network-side device or prescribed by a protocol; or the fourth parameter and the value of the fourth parameter are configured by the network-side device or prescribed by a protocol; or the fifth parameter and the value of the fifth parameter are configured by the network-side device or prescribed by a protocol.

In this embodiment of this disclosure, optionally, the first parameter, the second parameter, the third parameter, the fourth parameter, or the fifth parameter includes at least one of the following:
  the number of transmit antennas or transmit channels of the terminal device;
  the number of receive antennas or receive channels of the terminal device;
  the number of simultaneously activated uplink component carriers;
  the number of simultaneously activated downlink component carriers;
  a time interval between a PDCCH and a physical downlink shared channel PDSCH scheduled by the PDCCH;
  a time interval between a PDSCH and a corresponding ACK or NACK;
  a time interval between a PDCCH and a physical uplink shared channel PUSCH scheduled by the PDCCH;
  a PDSCH processing delay;
  a PUSCH preparation delay;
  the number of downlink MIMO layers;
  the number of uplink MIMO layers;
  a PDCCH monitoring period;
  a PDCCH monitoring offset;
  PDCCH monitoring duration;
  a DRX cycle;
  a bandwidth of a BWP;
  an identity ID of a BWP;
  DC;
  non-DC;
  a maximum uplink transmission rate;
  a maximum downlink transmission rate;
  the number of CSI reports simultaneously processable by the terminal device;
  the number of beam management reports simultaneously processable by the terminal device;
  the number of measurement resources simultaneously receivable or processable by the terminal device;
  a CSI report related delay; and
  a beam management report related delay.

The terminal device provided by this embodiment of this disclosure may perform the foregoing method embodiment. An implementation principle and a technical effect thereof are similar to those of the method embodiment. Details are not described again herein in this embodiment.

An embodiment of this disclosure further provides a network-side device. Because a problem resolving principle of the network-side device is similar to that of a configuration method in an embodiment of this disclosure, for implementation of the network-side device, refer to the implementation of the method. Details are not described again herein.

Figure 9:
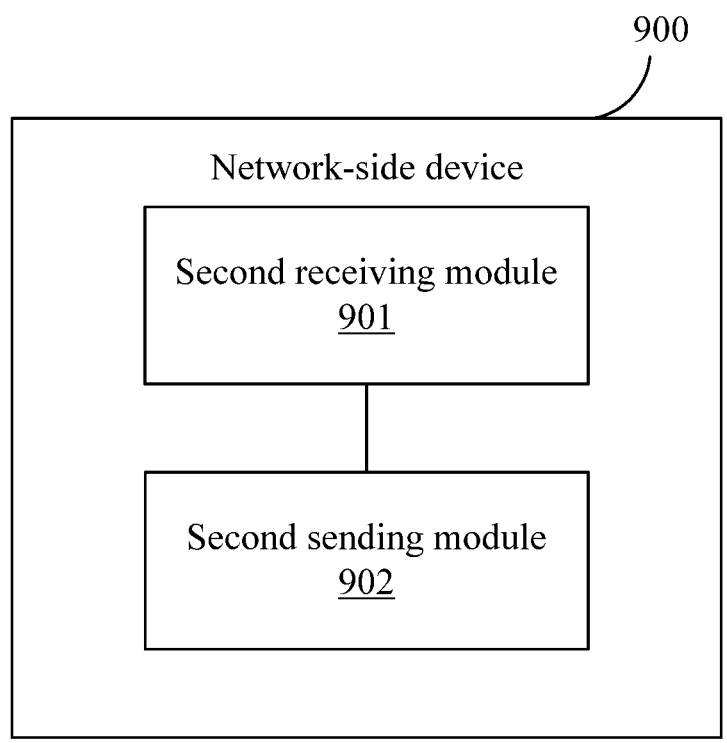
FIG. 9 is a schematic structural diagram 1 of a network-side device according to an embodiment of this disclosure.

Referring to FIG. 9, an embodiment of this disclosure further provides a network-side device. The network-side device 900 includes:
  a second receiving module 901, configured to receive a first message from a terminal device, where the first message explicitly or implicitly indicates a power saving mode or a power saving class of the terminal device; and
  a second sending module 902, configured to send first feedback information about the first message to the terminal device, so that the terminal device determines, based on the first feedback information, value(s) of one or more first parameters corresponding to the power saving mode or the power saving class of the terminal device.

In this embodiment of this disclosure, optionally, the first feedback information may include one or more of the following:
  an ACK or a NACK of the first message;
  an identity of a power saving mode or a power saving class configured by the network-side device for the terminal device; and
  value(s) of one or more second parameters configured by the network-side device for the terminal device, where the second parameter is related to power consumption of the terminal device.

In this embodiment of this disclosure, optionally, the first message includes a first field, and a value of the first field corresponds to value(s) of one or more third parameters, where the third parameter is related to power consumption of the terminal device; or
  the first message includes a second field, and a value of the second field corresponds to value(s) of one or more fourth parameters of a power saving mode or a power saving class; or
  the first message includes a third field, the third field includes one or more first bit strings, and a value of each first bit string corresponds to a value of a fifth parameter, where the fifth parameter is related to power consumption of the terminal device.

In this embodiment of this disclosure, optionally, the third parameter and the value of the third parameter are configured by the network-side device or prescribed by a protocol; or the fourth parameter and the value of the fourth parameter are configured by the network-side device or prescribed by a protocol; or the fifth parameter and the value of the fifth parameter are configured by the network-side device or prescribed by a protocol.

In this embodiment of this disclosure, optionally, the first parameter, the second parameter, the third parameter, the fourth parameter, or the fifth parameter includes at least one of the following:
  the number of transmit antennas or transmit channels of the terminal device;

the number of receive antennas or receive channels of the terminal device;
the number of simultaneously activated uplink component carriers;
the number of simultaneously activated downlink component carriers;
a time interval between a PDCCH and a PDSCH scheduled by the PDCCH;
a time interval between a PDSCH and a corresponding ACK or NACK;
a time interval between a PDCCH and a PUSCH scheduled by the PDCCH;
a PDSCH processing delay;
a PUSCH preparation delay;
the number of downlink MIMO layers;
the number of uplink MIMO layers;
a PDCCH monitoring period;
a PDCCH monitoring offset;
PDCCH monitoring duration;
a discontinuous reception DRX cycle;
a bandwidth of a BWP;
an ID of a BWP;
DC;
non-DC;
a maximum uplink transmission rate;
a maximum downlink transmission rate;
the number of CSI reports simultaneously processable by the terminal device;
the number of beam management reports simultaneously processable by the terminal device;
the number of measurement resources simultaneously receivable or processable by the terminal device;
a CSI report related delay; and
a beam management report related delay.

The network-side device provided by this embodiment of this disclosure may perform the foregoing method embodiment. An implementation principle and a technical effect thereof are similar to those of the method embodiment. Details are not described again herein in this embodiment.

An embodiment of this disclosure further provides a terminal device. Because a problem resolving principle of the terminal device is similar to that of a configuration method in an embodiment of this disclosure, for implementation of the terminal device, refer to the implementation of the method. Details are not described again herein.

Figure 10:
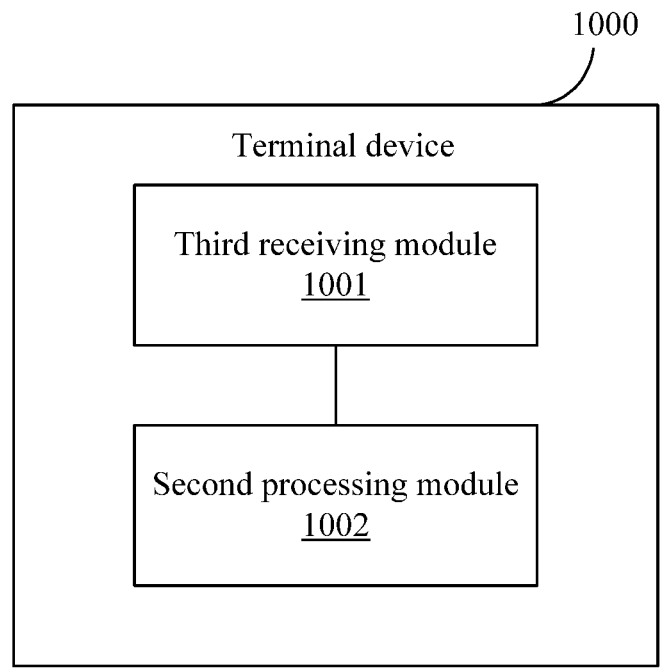
FIG. 10 is a schematic structural diagram 2 of a terminal device according to an embodiment of this disclosure.

Referring to FIG. 10, an embodiment of this disclosure further provides a terminal device. The terminal device 1000 includes:
a third receiving module 1001, configured to receive, from a network-side device, configuration information of a power saving mode or a power saving class of the terminal device; and
a second processing module 1002, configured to set, according to the configuration information, value(s) of one or more sixth parameters corresponding to the power saving mode or the power saving class of the terminal device.

In this embodiment of this disclosure, optionally, the third receiving module 1001 is specifically configured to receive the configuration information of the power saving mode or the power saving class of the terminal device by using radio resource control RRC signaling, media access control MAC signaling, or PDCCH signaling.

In this embodiment of this disclosure, optionally, the configuration information includes a fourth field, and a value of the fourth field corresponds to value(s) of one or more seventh parameters, where the seventh parameter is related to power consumption of the terminal device; or
the configuration information includes a fifth field, and a value of the fifth field corresponds to value(s) of one or more eighth parameters of a power saving mode or a power saving class; or
the configuration information includes a sixth field, the sixth field includes one or more second bit strings, and a value of each second bit string corresponds to a value of a ninth parameter, where the ninth parameter is related to power consumption of the terminal device.

Optionally, the seventh parameter and the value of the seventh parameter are configured by the network-side device or prescribed by a protocol; or the eighth parameter and the value of the eighth parameter are configured by the network-side device or prescribed by a protocol; or the ninth parameter and the value of the ninth parameter are configured by the network-side device or prescribed by a protocol.

In this embodiment of this disclosure, optionally, the sixth parameter, the seventh parameter, the eighth parameter, or the ninth parameter includes at least one of the following:
the number of transmit antennas or transmit channels of the terminal device;
the number of receive antennas or receive channels of the terminal device;
the number of simultaneously activated uplink component carriers;
the number of simultaneously activated downlink component carriers;
a time interval between a PDCCH and a PDSCH scheduled by the PDCCH;
a time interval between a PDSCH and a corresponding ACK or NACK;
a time interval between a PDCCH and a PUSCH scheduled by the PDCCH;
a PDSCH processing delay;
a PUSCH preparation delay;
the number of downlink MIMO layers;
the number of uplink MIMO layers;
a PDCCH monitoring period;
a PDCCH monitoring offset;
PDCCH monitoring duration;
a discontinuous reception DRX cycle;
a bandwidth of a BWP;
an ID of a BWP;
DC;
non-DC;
a maximum uplink transmission rate;
a maximum downlink transmission rate;
the number of CSI reports simultaneously processable by the terminal device;
the number of beam management reports simultaneously processable by the terminal device;
the number of measurement resources simultaneously receivable or processable by the terminal device;
a CSI report related delay; and
a beam management report related delay.

The terminal device provided by this embodiment of this disclosure may perform the foregoing method embodiment. An implementation principle and a technical effect thereof are similar to those of the method embodiment. Details are not described again herein in this embodiment.

An embodiment of this disclosure further provides a network-side device. Because a problem resolving principle of the network-side device is similar to that of a configuration method in an embodiment of this disclosure, for implementation of the network-side device, refer to the implementation of the method. Details are not described again herein.

Figure 11:
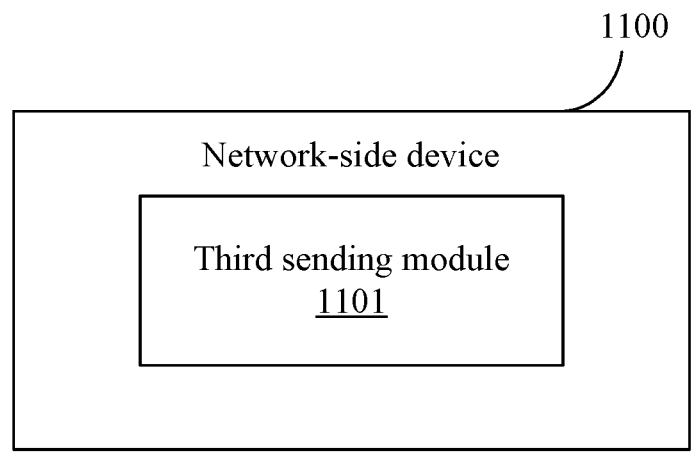
FIG. 11 is a schematic structural diagram 2 of a network-side device according to an embodiment of this disclosure.

Referring to FIG. 11, an embodiment of this disclosure further provides a network-side device. The network-side device 1100 includes:

a third sending module 1101, configured to send configuration information of a power saving mode or a power saving class of a terminal device to the terminal device, so that the terminal device sets, according to the configuration information, value(s) of one or more sixth parameters corresponding to the power saving mode or the power saving class of the terminal device.

In this embodiment of this disclosure, optionally, the third sending module 1101 is specifically configured to send the configuration information of the power saving mode or the power saving class of the terminal device to the terminal device by using RRC signaling, MAC signaling, or PDCCH signaling.

In this embodiment of this disclosure, optionally, the configuration information includes a fourth field, and a value of the fourth field corresponds to value(s) of one or more seventh parameters, where the seventh parameter is related to power consumption of the terminal device; or the configuration information includes a fifth field, and a value of the fifth field corresponds to value(s) of one or more eighth parameters of a power saving mode or a power saving class; or the configuration information includes a sixth field, the sixth field includes one or more second bit strings, and a value of each second bit string corresponds to a value of a ninth parameter, where the ninth parameter is related to power consumption of the terminal device.

In this embodiment of this disclosure, optionally, the seventh parameter and the value of the seventh parameter are configured by the network-side device or prescribed by a protocol; or the eighth parameter and the value of the eighth parameter are configured by the network-side device or prescribed by a protocol; or the ninth parameter and the value of the ninth parameter are configured by the network-side device or prescribed by a protocol.

In this embodiment of this disclosure, optionally, the sixth parameter, the seventh parameter, the eighth parameter, or the ninth parameter includes at least one of the following:

the number of transmit antennas or transmit channels of the terminal device;
the number of receive antennas or receive channels of the terminal device;
the number of simultaneously activated uplink component carriers;
the number of simultaneously activated downlink component carriers;
a time interval between a PDCCH and a PDSCH scheduled by the PDCCH;
a time interval between a PDSCH and an ACK or a NACK;
a time interval between a PDCCH and a PUSCH scheduled by the PDCCH;
a PDSCH processing delay;
a PUSCH preparation delay;
the number of downlink MIMO layers;
the number of uplink MIMO layers;
a PDCCH monitoring period;
a PDCCH monitoring offset;
PDCCH monitoring duration;
a bandwidth of a BWP;
an ID of a BWP;
DC;
non-DC;
a maximum uplink transmission rate;
a maximum downlink transmission rate;
the number of CSI reports simultaneously processable by the terminal device;
the number of beam management reports simultaneously processable by the terminal device;
the number of measurement resources simultaneously receivable or processable by the terminal device;
a CSI report related delay; and
a beam management report related delay.

The network-side device provided by this embodiment of this disclosure may perform the foregoing method embodiment. An implementation principle and a technical effect thereof are similar to those of the method embodiment. Details are not described again herein in this embodiment.

An embodiment of this disclosure further provides a terminal device. Because a problem resolving principle of the terminal device is similar to that of a configuration method in an embodiment of this disclosure, for implementation of the terminal device, refer to the implementation of the method. Details are not described again herein.

Figure 12:
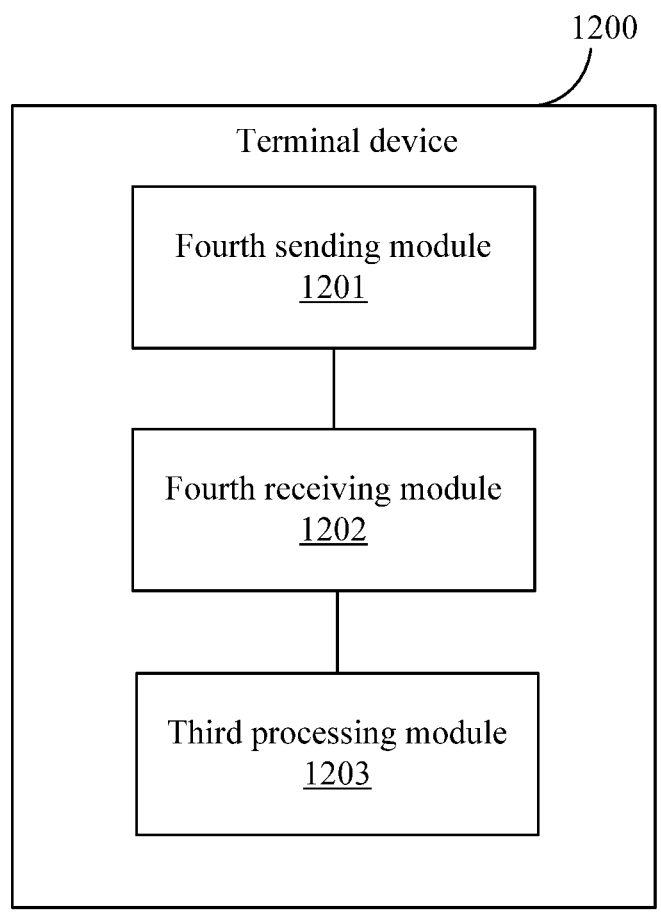
FIG. 12 is a schematic structural diagram 3 of a terminal device according to an embodiment of this disclosure.

Referring to FIG. 12, an embodiment of this disclosure further provides a terminal device. The terminal device 1200 includes:

a fourth sending module 1201, configured to send a second message to a network-side device, where the second message includes one or more tenth parameters, and the tenth parameter includes at least one of the following: the number of CSI reports simultaneously processable by the terminal device, the number of beam management reports simultaneously processable by the terminal device, the number of measurement resources simultaneously receivable or processable by the terminal device, a CSI report related delay, and a beam management report related delay;

a fourth receiving module 1202, configured to receive, from the network-side device, second feedback information about the second message; and a third processing module 1203, configured to set a value of the tenth parameter based on the second feedback information, or perform signal processing based on the second feedback information.

In this embodiment of this disclosure, optionally, the second feedback information includes at least one of the following:

an ACK or a NACK of the second message; and
the value of the at least one tenth parameter configured by the network-side device for the terminal device.

The terminal device provided by this embodiment of this disclosure may perform the foregoing method embodiment. An implementation principle and a technical effect thereof are similar to those of the method embodiment. Details are not described again herein in this embodiment.

An embodiment of this disclosure further provides a network-side device. Because a problem resolving principle of the network-side device is similar to that of a configuration method in an embodiment of this disclosure, for implementation of the network-side device, refer to the implementation of the method. Details are not described again herein.

Figure 13:
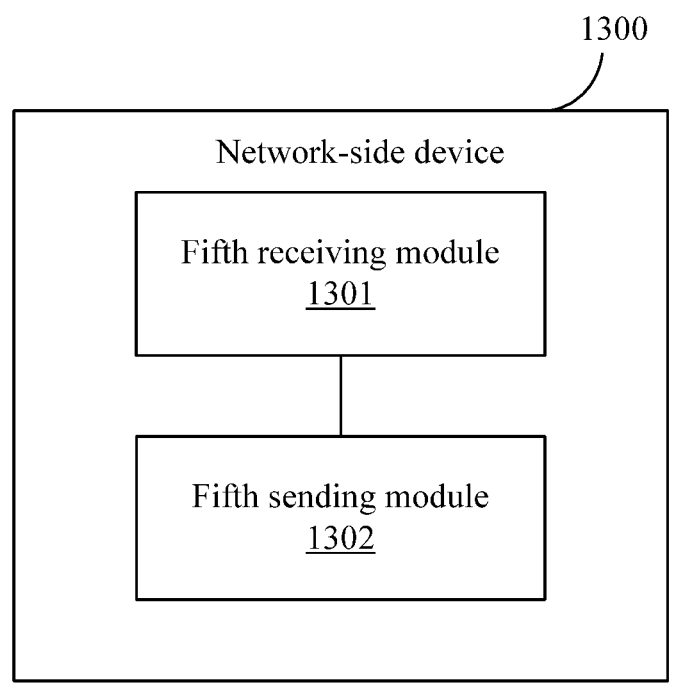
FIG. 13 is a schematic structural diagram 3 of a network-side device according to an embodiment of this disclosure.

Referring to FIG. 13, an embodiment of this disclosure further provides a network-side device. The network-side device 1300 includes:

a fifth receiving module 1301, configured to receive a second message from a terminal device, where the second message includes one or more tenth parameters, and each tenth parameter includes at least one of the following: the number of CSI reports simultaneously processable by the terminal device, the number of beam management reports simultaneously processable by the terminal device, the number of measurement resources simultaneously receivable or processable by the terminal device, a CSI report related delay, and a beam management report related delay; and a fifth sending module 1302, configured to send second feedback information about the second message to the terminal device, so that the terminal device sets a value of the tenth parameter based on the second feedback information or performs signal processing based on the second feedback information.

In this embodiment of this disclosure, optionally, the second feedback information includes at least one of the following:

an ACK or a NACK of the second message; and
the value of the at least one tenth parameter configured by the network-side device for the terminal device.

The network-side device provided by this embodiment of this disclosure may perform the foregoing method embodiment. An implementation principle and a technical effect thereof are similar to those of the method embodiment. Details are not described again herein in this embodiment.

Figure 14:
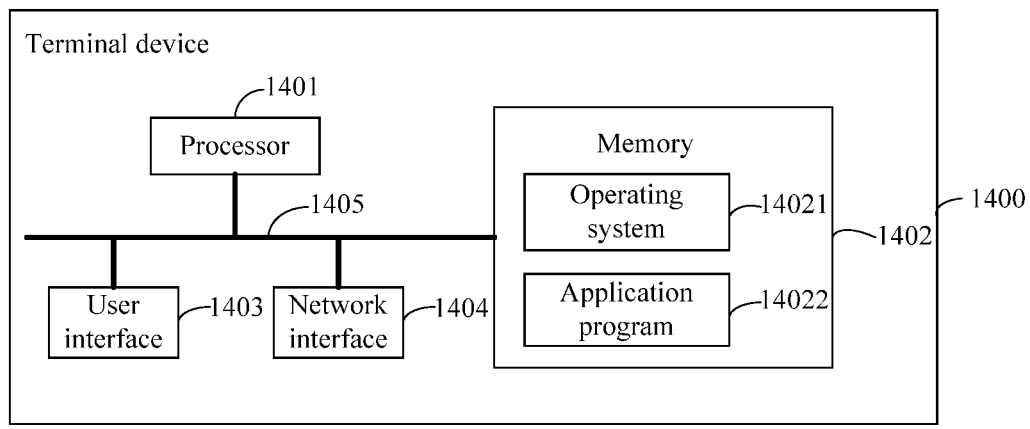
FIG. 14 is a schematic structural diagram 4 of a terminal device according to an embodiment of this disclosure.

As shown in FIG. 14, a terminal device 1400 shown in FIG. 14 includes at least one processor 1401, a memory 1402, at least one network interface 1404, and a user interface 1403. The components of the terminal device 1400 are coupled together by using a bus system 1405. It may be understood that the bus system 1405 is configured to implement connection and communication between these components. The bus system 1405 further includes a power bus, a control bus, and a status signal bus, in addition to a data bus. However, for clarity of description, various buses are marked as the bus system 1405 in FIG. 14.

The user interface 1403 may include a display, a keyboard, or a pointing device (for example, a mouse, a trackball (trackball), a touch panel, or a touchscreen).

It may be understood that the memory 1402 in this embodiment of this disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external cache. For example but not for restrictive description, a plurality of forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 1402 in the terminal device 1400 and method described in this embodiment of this disclosure is intended to include but is not limited to these and any other appropriate types of memories.

In some implementations, the memory 1402 stores the following elements: executable modules or data structures, or a subset thereof, or an extended set thereof: an operating system 14021 and an application program 14022.

The operating system 14021 includes various system programs, such as a framework layer, a kernel library layer, and a driver layer, for implementing various basic services and processing hardware-based tasks. The application program 14022 includes various application programs, such as a media player (Media Player) and a browser (Browser), for implementing various application services. A program for implementing the method in this embodiment of this disclosure may be included in the application program 14022.

In an embodiment of this disclosure, when a program or an instruction stored in the memory 1402, which may be specifically a program or an instruction stored in the application program 14022, is executed through invocation, the following steps are implemented: sending a first message to a network-side device, where the first message explicitly or implicitly indicates a power saving mode or a power saving class of the terminal device; receiving, from the network-side device, first feedback information about the first message; and determining, based on the first feedback information, value(s) of one or more first parameters related to power consumption of the terminal device.

In another embodiment of this disclosure, when a program or an instruction stored in the memory 1402, which may be specifically a program or an instruction stored in the application program 14022, is executed through invocation, the following steps are implemented: receiving, from a network-side device, configuration information of a power saving mode or a power saving class of the terminal device; and setting, according to the configuration information, value(s) of one or more sixth parameters related to power consumption of the terminal device.

In still another embodiment of this disclosure, when a program or an instruction stored in the memory 1402, which may be specifically a program or an instruction stored in the application program 14022, is executed through invocation, the following steps are implemented: sending a second message to a network-side device, where the second message includes one or more tenth parameters, and the tenth parameter includes at least one of the following: the number of CSI reports simultaneously processable by the terminal device, the number of beam management reports simultaneously processable by the terminal device, the number of measurement resources simultaneously receivable or processable by the terminal device, a CSI report related delay, and a beam management report related delay; receiving, from the network-side device, second feedback information about the second message; and setting a value of the tenth parameter based on the second feedback information; or performing signal processing based on the second feedback information.

The user equipment provided by this embodiment of this disclosure may perform the foregoing method embodiment. An implementation principle and a technical effect thereof are similar to those of the method embodiment. Details are not described again herein in this embodiment.

Figure 15:
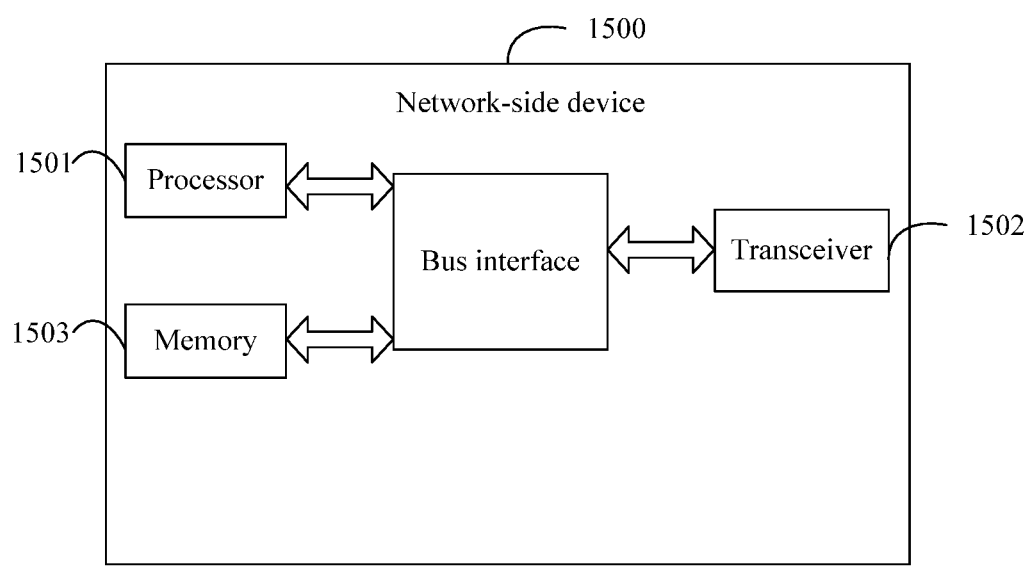
FIG. 15 is a schematic structural diagram 4 of a network-side device according to an embodiment of this disclosure.

FIG. 15 is a structural diagram of a network-side device according to an embodiment of this disclosure. As shown in FIG. 15, the network-side device 1500 includes a processor 1501, a transceiver 1502, a memory 1503, and a bus interface.

In an embodiment of this disclosure, the network-side device 1500 further includes a computer program stored in the memory 1503 and capable of running on the processor

1501. When the computer program is executed by the processor 1501, the following steps are implemented: receiving a first message from a terminal device, where the first message explicitly or implicitly indicates a power saving mode or a power saving class of the terminal device; and sending first feedback information about the first message to the terminal device, so that the terminal device determines, based on the first feedback information, value(s) of one or more first parameters related to power consumption of the terminal device.

In another embodiment of this disclosure, the network-side device 1500 further includes a computer program stored in the memory 1503 and capable of running on the processor 1501. When the computer program is executed by the processor 1501, the following steps are implemented: sending configuration information of a power saving mode or a power saving class of a terminal device to the terminal device, so that the terminal device sets value(s) of one or more sixth parameters of the power saving mode or the power saving class of the terminal device according to the configuration information.

In still another embodiment of this disclosure, the network-side device 1500 further includes a computer program stored in the memory 1503 and capable of running on the processor 1501. When the computer program is executed by the processor 1501, the following steps are implemented: receiving a second message from a terminal device, where the second message includes one or more tenth parameters, and each tenth parameter includes at least one of the following: the number of CSI reports simultaneously processable by the terminal device, the number of beam management reports simultaneously processable by the terminal device, the number of measurement resources simultaneously receivable or processable by the terminal device, a CSI report related delay, and a beam management report related delay; and sending second feedback information about the second message to the terminal device, so that the terminal device sets a value of the tenth parameter based on the second feedback information or performs signal processing based on the second feedback information.

In FIG. 15, a bus architecture may include any number of interconnect buses and bridges, specifically for interconnecting various circuits of one or more processors represented by the processor 1501 and a memory represented by the memory 1503. The bus architecture may further interconnect various other circuits such as a peripheral device, a voltage regulator, and a power management circuit. These are all well known in the art, and therefore are not further described in this specification. The bus interface provides an interface. The transceiver 1502 may be a plurality of components, that is, the transceiver 1502 includes a transmitter and a receiver, and provides a unit for communicating with various other apparatuses on a transmission medium.

The processor 1501 is responsible for bus architecture management and general processing. The memory 1503 may store data used when the processor 1501 performs an operation.

The network-side device provided by this embodiment of this disclosure may perform the foregoing method embodiment. An implementation principle and a technical effect thereof are similar to those of the method embodiment. Details are not described again herein in this embodiment.

Method or algorithm steps described in combination with the content disclosed in this disclosure may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a removable hard disk, a CD-ROM, or a storage medium of any other form well known in the art. For example, a storage medium is coupled to the processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this disclosure may be implemented by hardware, software, firmware, or any combination thereof. When being implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any usable medium accessible to a general-purpose or special-purpose computer.

The objectives, technical solutions, and beneficial effects of this disclosure are further described in detail in the foregoing specific implementations. It should be understood that the foregoing descriptions are merely specific implementations of this disclosure, and are not intended to limit the protection scope of this disclosure. Any modification, equivalent replacement, improvement, or the like made based on the technical solutions in this disclosure shall fall within the protection scope of this disclosure.

A person skilled in the art should understand that the embodiments of this disclosure may be provided as a method, a system, or a computer program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a compact disc read-only memory (Compact Disc Read-Only Memory, CD-ROM), an optical memory, and the like) that include computer-usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer-readable memory that can instruct the computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Apparently, a person skilled in the art may make various changes and variations to the embodiments of this disclosure without departing from the spirit and scope of this disclosure. Therefore, this disclosure is intended to cover the changes and variations provided that the changes and variations of the embodiments of this disclosure fall within the scope of the claims of this disclosure or equivalent technologies thereof

What is claimed is:

1. A configuration method, applied to a terminal device and comprising:
    receiving, from a network-side device, configuration information by using physical downlink control channel (PDCCH) signaling; and
    setting, according to the configuration information, values of sixth parameters;
    wherein the configuration information comprises a field, the field comprises two bits, and different values of the two bits correspond to values of the sixth parameters, the sixth parameters comprise a time interval between a PDCCH and a physical downlink shared channel (PDSCH) scheduled by the PDCCH, and a time interval between a PDCCH and a physical uplink shared channel (PUSCH) scheduled by the PDCCH;
    wherein the sixth parameters further comprise the following:
    the number of simultaneously activated uplink component carriers;
    the number of simultaneously activated downlink component carriers;
    a PDSCH processing delay; and
    a PUSCH preparation delay.

2. The method according to claim 1, wherein
    the configuration information comprises a fourth field, and a value of the fourth field corresponds to value(s) of one or more seventh parameters, wherein the seventh parameter is related to power consumption of the terminal device; or
    the configuration information further comprises a fifth field, and a value of the fifth field corresponds to value(s) of one or more eighth parameters corresponding to a power saving mode or a power saving class; or
    the configuration information further comprises a sixth field, the sixth field comprises one or more second bit strings, and a value of each second bit string corresponds to a value of a ninth parameter, wherein the ninth parameter is related to power consumption of the terminal device.

3. The method according to claim 2, wherein
    the seventh parameter and the value of the seventh parameter are configured by the network-side device or prescribed by a protocol; or
    the eighth parameter and the value of the eighth parameter are configured by the network-side device or prescribed by a protocol; or
    the ninth parameter and the value of the ninth parameter are configured by the network-side device or prescribed by a protocol.

4. The method according to claim 2, wherein the seventh parameter, the eighth parameter or the ninth parameter comprises at least one of the following:
    the number of transmit antennas or transmit channels of the terminal device;
    the number of receive antennas or receive channels of the terminal device;
    the number of simultaneously activated uplink component carriers;
    the number of simultaneously activated downlink component carriers;
    a time interval between a PDCCH and a physical downlink shared channel (PDSCH) scheduled by the PDCCH;
    a time interval between a PDSCH and a corresponding acknowledgment (ACK) or negative acknowledgment (NACK);
    a time interval between a PDCCH and a physical uplink shared channel (PUSCH) scheduled by the PDCCH;
    a PDSCH processing delay;
    a PUSCH preparation delay;
    the number of downlink multiple-input multiple-output (MIMO) layers;
    the number of uplink MIMO layers;
    a PDCCH monitoring period;
    a PDCCH monitoring offset;
    PDCCH monitoring duration;
    a discontinuous reception (DRX) cycle;
    a bandwidth of a bandwidth part (BWP);
    an identity (ID) of a BWP;
    dual connectivity (DC);
    non-dual connectivity (non-DC);
    a maximum uplink transmission rate;
    a maximum downlink transmission rate;
    the number of channel state information (CSI) reports simultaneously processable by the terminal device;
    the number of beam management reports simultaneously processable by the terminal device;
    the number of measurement resources simultaneously receivable or processable by the terminal device;
    a CSI report related delay; and
    a beam management report related delay.

5. The method according to claim 1, wherein the sixth parameters further comprise at least one of the following:
    the number of transmit antennas or transmit channels of the terminal device;
    the number of receive antennas or receive channels of the terminal device;
    a time interval between a PDSCH and a corresponding acknowledgment (ACK) or negative acknowledgment (NACK);
    the number of downlink multiple-input multiple-output (MIMO) layers;
    the number of uplink MIMO layers;
    a PDCCH monitoring period;
    a PDCCH monitoring offset;
    PDCCH monitoring duration;

a discontinuous reception (DRX) cycle;
a bandwidth of a bandwidth part (BWP);
an identity (ID) of a BWP;
dual connectivity (DC);
non-dual connectivity (non-DC);
a maximum uplink transmission rate;
a maximum downlink transmission rate;
the number of channel state information (CSI) reports simultaneously processable by the terminal device;
the number of beam management reports simultaneously processable by the terminal device;
the number of measurement resources simultaneously receivable or processable by the terminal device;
a CSI report related delay; and
a beam management report related delay.

6. A configuration method, applied to a network-side device and comprising:
sending configuration information to the terminal device by using physical downlink control channel (PDCCH) signaling, so that the terminal device sets value(s) of sixth parameters according to the configuration information;
wherein the configuration information comprises a field, the field comprises two bits, and different values of the two-bits field correspond to values of the sixth parameters, the sixth parameters comprise a time interval between a PDCCH and a physical downlink shared channel (PDSCH) scheduled by the PDCCH, and a time interval between a PDCCH and a physical uplink shared channel (PUSCH) scheduled by the PDCCH;
wherein the sixth parameters further comprise the following:
the number of simultaneously activated uplink component carriers;
the number of simultaneously activated downlink component carriers;
a PDSCH processing delay; and
a PUSCH preparation delay.

7. A network-side device, comprising a processor, a memory, and a computer program stored in the memory and capable of running on the processor, wherein when the computer program is executed by the processor, the steps of the configuration method according to claim 6 are implemented.

8. A terminal device, comprising a processor, a memory, and a computer program stored in the memory and capable of running on the processor, wherein when the computer program is executed by the processor, following steps are implemented:
receiving, from a network-side device, configuration information by using physical downlink control channel (PDCCH) signaling; and
setting, according to the configuration information, values of sixth parameters;
wherein the configuration information comprises a field, the field comprises two bits, and different values of the two bits correspond to values of the sixth parameters, the sixth parameters comprise a time interval between a PDCCH and a physical downlink shared channel (PDSCH) scheduled by the PDCCH, and a time interval between a PDCCH and a physical uplink shared channel (PUSCH) scheduled by the PDCCH;
wherein the sixth parameters further comprise the following:
the number of simultaneously activated uplink component carriers;
the number of simultaneously activated downlink component carriers;
a PDSCH processing delay; and
a PUSCH preparation delay.

9. The terminal device according to claim 8, wherein
the configuration information comprises a fourth field, and a value of the fourth field corresponds to value(s) of one or more seventh parameters, wherein the seventh parameter is related to power consumption of the terminal device; or
the configuration information further comprises a fifth field, and a value of the fifth field corresponds to value(s) of one or more eighth parameters corresponding to a power saving mode or a power saving class; or
the configuration information further comprises a sixth field, the sixth field comprises one or more second bit strings, and a value of each second bit string corresponds to a value of a ninth parameter, wherein the ninth parameter is related to power consumption of the terminal device.

10. The terminal device according to claim 9, wherein
the seventh parameter and the value of the seventh parameter are configured by the network-side device or prescribed by a protocol; or
the eighth parameter and the value of the eighth parameter are configured by the network-side device or prescribed by a protocol; or
the ninth parameter and the value of the ninth parameter are configured by the network-side device or prescribed by a protocol.

11. The terminal device according to claim 9, wherein the seventh parameter, the eighth parameter or the ninth parameter comprises at least one of the following:
the number of transmit antennas or transmit channels of the terminal device;
the number of receive antennas or receive channels of the terminal device;
the number of simultaneously activated uplink component carriers;
the number of simultaneously activated downlink component carriers;
a time interval between a PDCCH and a physical downlink shared channel (PDSCH) scheduled by the PDCCH;
a time interval between a PDSCH and a corresponding acknowledgment (ACK) or negative acknowledgment (NACK);
a time interval between a PDCCH and a physical uplink shared channel (PUSCH) scheduled by the PDCCH;
a PDSCH processing delay;
a PUSCH preparation delay;
the number of downlink multiple-input multiple-output (MIMO) layers;
the number of uplink MIMO layers;
a PDCCH monitoring period;
a PDCCH monitoring offset;
PDCCH monitoring duration;
a discontinuous reception (DRX) cycle;
a bandwidth of a bandwidth part (BWP);
an identity (ID) of a BWP;
dual connectivity (DC);
non-dual connectivity (non-DC);
a maximum uplink transmission rate;
a maximum downlink transmission rate;
the number of channel state information (CSI) reports simultaneously processable by the terminal device;

the number of beam management reports simultaneously processable by the terminal device;
the number of measurement resources simultaneously receivable or processable by the terminal device;
a CSI report related delay; and
a beam management report related delay.

12. The terminal device according to claim 7, wherein the sixth parameters further comprise at least one of the following:
the number of transmit antennas or transmit channels of the terminal device;
the number of receive antennas or receive channels of the terminal device;
a time interval between a PDSCH and a corresponding acknowledgment (ACK) or negative acknowledgment (NACK);
the number of downlink multiple-input multiple-output (MIMO) layers;
the number of uplink MIMO layers;
a PDCCH monitoring period;
a PDCCH monitoring offset;
PDCCH monitoring duration;
a discontinuous reception (DRX) cycle;
a bandwidth of a bandwidth part (BWP);
an identity (ID) of a BWP;
dual connectivity (DC);
non-dual connectivity (non-DC);
a maximum uplink transmission rate;
a maximum downlink transmission rate;
the number of channel state information (CSI) reports simultaneously processable by the terminal device;
the number of beam management reports simultaneously processable by the terminal device;
the number of measurement resources simultaneously receivable or processable by the terminal device;
a CSI report related delay; and
a beam management report related delay.

* * * * *